(12) United States Patent
Kim et al.

(10) Patent No.: US 10,685,059 B2
(45) Date of Patent: Jun. 16, 2020

(54) PORTABLE ELECTRONIC DEVICE AND METHOD FOR GENERATING A SUMMARY OF VIDEO DATA

(71) Applicant: LG ELECTRONICS INC., Seoul (KR)

(72) Inventors: Younghan Kim, Seoul (KR); Jaeho Kwak, Seoul (KR); Jaehwan Park, Seoul (KR); Sanghyun Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 209 days.

(21) Appl. No.: 15/727,014

(22) Filed: Oct. 6, 2017

(65) Prior Publication Data

US 2018/0341705 A1 Nov. 29, 2018

(30) Foreign Application Priority Data

May 29, 2017 (KR) .................. 10-2017-0066351

(51) Int. Cl.
*G06F 16/738* (2019.01)
*G06K 9/00* (2006.01)
(Continued)

(52) U.S. Cl.
CPC .......... *G06F 16/739* (2019.01); *G06F 3/0482* (2013.01); *G06F 3/0488* (2013.01);
(Continued)

(58) Field of Classification Search
CPC .. G06F 3/04842; G06F 3/0482; G06F 16/739; G06F 16/7837; G06F 16/784;
(Continued)

(56) References Cited

U.S. PATENT DOCUMENTS 7,181,757 B1    1/2007  Kim et al.
7,916,894 B1 *  3/2011  Dhillon ............... G06F 16/784
                                                              382/103
(Continued)

FOREIGN PATENT DOCUMENTS

EP    2530675 A2    12/2012
EP    2530675 A3    4/2013
(Continued)

OTHER PUBLICATIONS

European Extended Search Report in European Application No. 17195100, dated Jul. 31, 2018, 14 pages.
(Continued)

*Primary Examiner* — Nicholas Ulrich
(74) *Attorney, Agent, or Firm* — Fish & Richardson P.C.

(57) ABSTRACT

A portable electronic device according to the present disclosure may include a memory configured to store video data, a touch screen configured to receive a touch input related to a summary of the video data, and a controller configured to generate the summary of the video data in response to the touch input, wherein the controller extracts objects included in the video data, and detects a section in which at least one of the extracted objects appears and then disappears, and edits the video data based on the detected section to generate a summary of the video data.

17 Claims, 23 Drawing Sheets

(51) Int. Cl.
    *G06F 3/0482* (2013.01)
    *G06F 16/783* (2019.01)
    *G11B 27/031* (2006.01)
    *G06F 16/33* (2019.01)
    *H04N 21/8549* (2011.01)
    *G06F 3/0488* (2013.01)
    *G06F 3/0484* (2013.01)
    *H04N 21/234* (2011.01)
    *H04N 21/2343* (2011.01)

(52) U.S. Cl.
    CPC ...... *G06F 3/04842* (2013.01); *G06F 16/3341* (2019.01); *G06F 16/7837* (2019.01); *G06K 9/00751* (2013.01); *G06K 9/00765* (2013.01); *G11B 27/031* (2013.01); *H04N 21/23418* (2013.01); *H04N 21/23439* (2013.01); *H04N 21/8549* (2013.01)

(58) Field of Classification Search
    CPC ......... H04N 21/8549; H04N 21/23418; H04N 21/44008; H04N 21/84; H04N 21/23439; H04N 21/4316; H04N 21/854; G06K 9/00751; G06K 9/00718; G06K 9/00288; G06K 9/00765
    See application file for complete search history.

(56) References Cited

U.S. PATENT DOCUMENTS

| | | | |
|---|---|---|---|
| 8,643,746 B2* | 2/2014 | Karn | H04N 5/23219 348/231.99 |
| 8,665,345 B2* | 3/2014 | Karn | G11B 27/24 348/222.1 |
| 9,805,766 B1* | 10/2017 | Peng | G11B 27/28 |
| 10,169,659 B1* | 1/2019 | Pearson | G06K 9/00751 |
| 2009/0110247 A1* | 4/2009 | Kim | G06K 9/00288 382/118 |
| 2010/0104146 A1* | 4/2010 | Momosaki | G06K 9/00295 382/118 |
| 2011/0292244 A1* | 12/2011 | Deever | G11B 27/10 348/231.2 |
| 2012/0039539 A1 | 2/2012 | Boiman | |
| 2012/0213490 A1* | 8/2012 | Steiner | G11B 27/28 386/241 |
| 2016/0007100 A1 | 1/2016 | Lim et al. | |
| 2016/0125027 A1* | 5/2016 | Ohara | G06F 16/3341 707/767 |
| 2016/0307044 A1* | 10/2016 | Marilly | G06K 9/00751 |

FOREIGN PATENT DOCUMENTS

| | | |
|---|---|---|
| KR | 2001019343 A2 | 3/2001 |
| KR | 2013127639 A2 | 11/2013 |
| KR | 2017011934 A2 | 2/2017 |

OTHER PUBLICATIONS

Partial European Search Report in European Application No. 17195100.7, dated May 15, 2018, 14 pages.

* cited by examiner

FIG. 3C

|  | 0f | 1f | 2f | 3f | 4f | 5f | 6f | 7f | 8f |
|---|---|---|---|---|---|---|---|---|---|
| Architecture | -0.999 | -0.999 | -0.947 | -0.954 | -0.987 | -0.947 | -0.948 | 0.138 | -0.356 |
| Indoor | -0.021 | -0.022 | -0.063 | -0.063 | 1.000 | 0.243 | 1.000 | -0.988 | -0.601 |
| Kitchen | -1.000 | -1.000 | -1.000 | 1.000 | 1.000 | 1.000 | 1.000 | 1.000 | -1.000 |
| ⋮ | ⋮ | ⋮ | ⋮ | ⋮ | ⋮ | ⋮ | ⋮ | ⋮ | ⋮ |

PORTABLE ELECTRONIC DEVICE AND METHOD FOR GENERATING A SUMMARY OF VIDEO DATA

CROSS-REFERENCE TO RELATED APPLICATIONS

This application claims the benefit of priority of Korean Patent Application No. 10-2017-0066351, filed on May 29, 2017, which is herein expressly incorporated by reference in their entireties.

BACKGROUND OF THE INVENTION

1. Field of the Invention

The present disclosure relates to a portable electronic device that provides a summary of video data.

2. Description of the Related Art

Terminals may be divided into mobile/portable terminals and stationary terminals according to their mobility. Furthermore, the mobile terminal can be further classified into two types, such as a handheld terminal and a vehicle mount terminal based on whether or not it can be directly carried by a user.

Portable electronic devices have become increasingly more functional. For example, the functions may include data and voice communication, photographing and video shooting through a camera, voice recording, music file playback through a speaker system, and displaying an image or video on a display unit. Some terminals further include an electronic game play function or perform a multimedia player function. In particular, in recent years, portable electronic devices may receive multicast signals that provide visual content such as broadcast, video or television programs.

As it becomes multifunctional, for example, such a terminal is allowed to capture still images or moving images, play music or video files, play games, receive broadcast and the like, so as to be implemented as an integrated multimedia player.

In order to support and enhance the functions of the terminal, the improvement of structural or software elements of the terminal may be taken into consideration.

In recent years, with improvements in a camera function of a portable electronic device, technologies for shooting and editing video using a camera of the portable electronic device have been developed. For an example, editing technologies for video may include auto-highlighting technologies for generating a summary of video that compressively displays the video.

However, auto-highlighting technologies in the related art may shorten a playback time of a video without considering a key portion of the video, causing a problem that the summary does not include a highlight portion of the video or a portion in which a user is interested.

SUMMARY OF THE INVENTION

An object of the present disclosure is to provide a method of extracting interesting content from a video to generate a video summary.

Furthermore, another object of the present disclosure is to provide a method of extracting interesting content from a plurality of images to generate a summary.

In addition, still another object of the present disclosure is to provide a user interface for editing a summary of video data.

A portable electronic device according to an embodiment of the present disclosure may include a memory configured to store video data, a touch screen configured to receive a touch input related to a summary of the video data, and a controller configured to generate the summary of the video data in response to the touch input, wherein the controller extracts objects included in the video data, and detects a section in which at least one of the extracted objects appears and then disappears, and edits the video data based on the detected section to generate a summary of the video data.

According to an embodiment, the controller may display tags corresponding to the extracted objects, respectively, on the touch screen, and detect a section in which objects corresponding to at least one tag among the tags appear and then disappear based on a touch input to the at least one tag.

According to an embodiment, the controller may detect a section in which objects corresponding to two or more tags among the tags appear and then disappear according to a different operation condition according to a touch type of touch input applied to the two or more tags.

According to an embodiment, the controller may detect a section in which two or more objects corresponding to the two or more tags, respectively, appear and then disappear at the same time when a first type of touch input is applied to the two or more tags, and detect a section in which at least one of two or more objects corresponding to the two or more tags, respectively, appears and then disappears when a second type of touch input is applied to the two or more tags.

According to an embodiment, the controller may generate a plurality of summaries having different playback times based on the detected sections, and display preview images of the plurality of summaries on different regions of the touch screen, respectively.

According to an embodiment, when any one summary of the plurality of summaries is played back, the controller may play the remaining summaries except the any one summary at a time point corresponding to a playback time of the any one summary.

According to an embodiment, the controller may detect additional images added to the remaining summaries based on a summary having the shortest playback time among the plurality of summaries, and further display an image corresponding to an additional image on preview images of the remaining summaries.

According to an embodiment, a plurality of image data may be stored in the memory, and the controller may extract at least one image data satisfying a preset condition among the plurality of image data, and generate a summary of image data based on a section in which at least one of objects included in the extracted at least one image data appears and then disappears.

According to an embodiment, the preset condition may be a condition related to at least one of location, time, image, and audio information.

According to an embodiment, the controller may divide the video data into a plurality of frames, and extract a start frame in which an object appears and an end frame in which the object disappears for each of the objects included in the video data.

According to an embodiment, the controller may detect a section between the start frame in which the object appears and the end frame in which the object disappears as a section in which the object appears and then disappears.

According to an embodiment, the controller may assign a priority between objects included in the video data, and determine at least one object to be included in the summary among the objects based on the priority.

According to an embodiment, the priority may be determined by at least one of a use frequency of tags corresponding to an object and a category of the object.

According to an embodiment, the controller may display a thumbnail image corresponding to the detected section on the touch screen, and edit the detected section based on a touch input to the thumbnail image.

According to an embodiment, the controller may increase or decrease at least one of a playback time or a playback speed of the detected section.

A method of controlling a portable electronic device according to another embodiment of the present disclosure may include receiving a touch input related to a summary of video data, extracting objects included in the video data in response to the touch input, detecting a section in which at least one of the extracted objects appears and then disappears, and generating a summary of the video data based on the detected section.

According to an embodiment, said detecting a section in which the at least one of the extracted objects appears and then disappears may divide the video data into a plurality of frames having a preset time period, and extract a start frame in which at least one object of the plurality of frames appears and an end frame in which the at least one object disappears, and detect a section between the extracted start frame and the extracted end frame.

According to an embodiment, a priority may be assigned between the extracted objects, and the at least one object may be determined based on the priority.

According to an embodiment, the section in which at least one object appears and then disappears may be a section in which the at least one object appears and then disappears at the same time.

According to an embodiment, the summary of the video data may increase or decrease a playback time or capacity based on a user control command.

The present disclosure may detect a section in which objects included in a video appear and then disappear through a scene detection technology, and generate a summary of video data based on a section in which at least one of the objects of the video appears and then disappears according to a user's selection or priority, thereby generating a summary including key content or interesting scenes of the video. Accordingly, the present disclosure may generate a summary including a key portion of a video or a portion that may arouse a user's interest.

Furthermore, the present disclosure may detect an object for each frame constituting a video using a scene detection technology, thereby detecting the emergence and exit of an object, a scene transition, a place change or the like without tracking the object in real time.

In addition, the present disclosure may generate a summary of a plurality of image data satisfying a preset condition, thereby quickly and easily providing information on the plurality of image data satisfying the preset condition.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 3A through 3C are conceptual views for explaining the flowchart of FIG. 2;

DETAILED DESCRIPTION OF THE INVENTION

Figure 1:
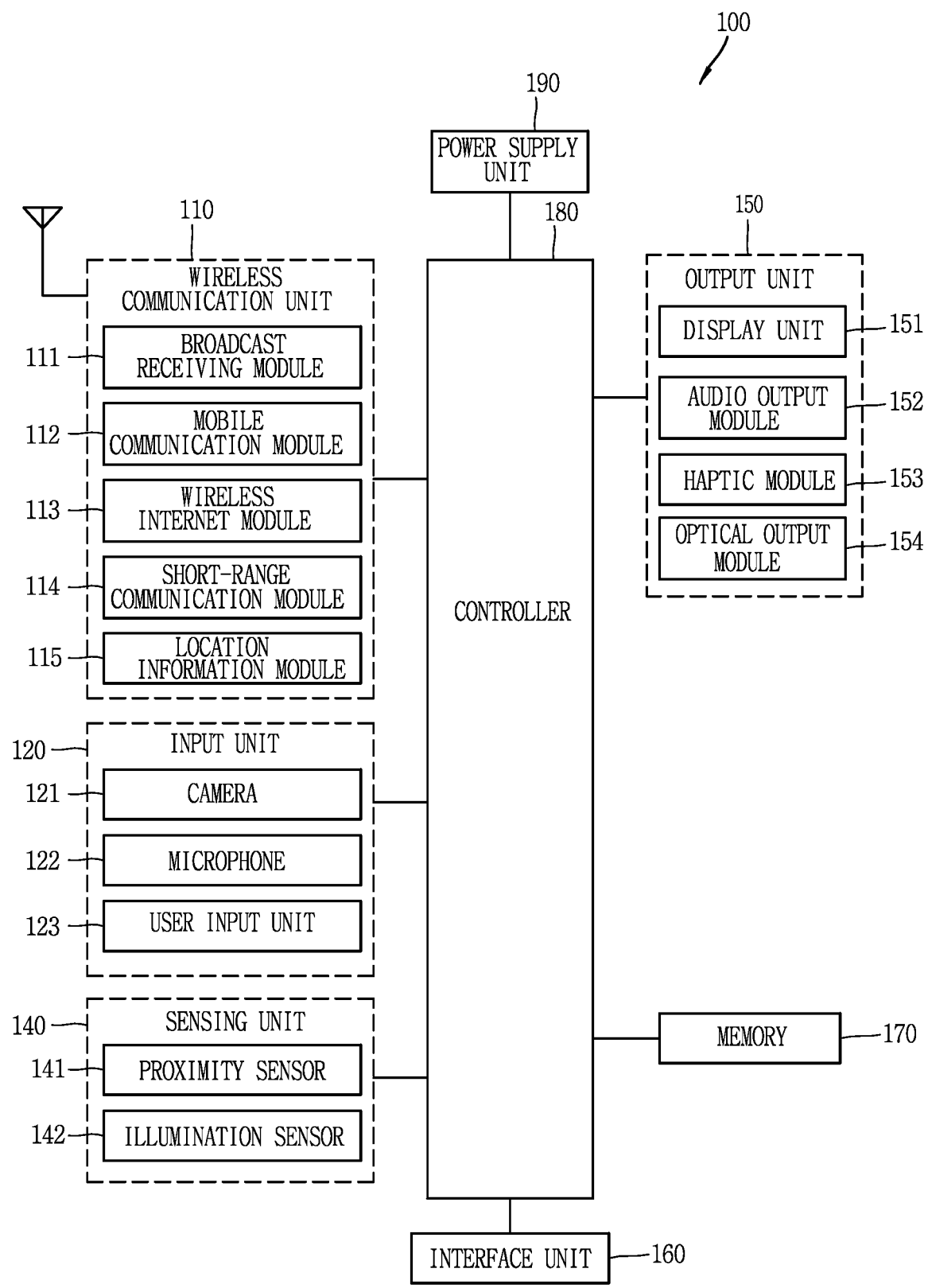
FIG. 1 is a block diagram for explaining a portable electronic device related to the present disclosure.

Hereinafter, preferred embodiments of the present disclosure will be described in detail with reference to the accompanying drawings, and the same or similar elements are designated with the same numeral references regardless of the numerals in the drawings and their redundant description will be omitted. A suffix 'module' or 'unit' used for constituent elements disclosed in the following description is merely intended for easy description of the specification, and the suffix itself does not give any special meaning or function. In describing the present disclosure, moreover, the detailed description will be omitted when a specific description for publicly known technologies to which the invention pertains is judged to obscure the gist of the present disclosure. The accompanying drawings are used to help easily understand the technical idea of the present disclosure and it should be understood that the idea of the present disclosure is not limited by the accompanying drawings.

It will be understood that although the terms first, second, etc. may be used herein to describe various elements, these elements should not be limited by these terms. These terms are generally only used to distinguish one element from another.

It will be understood that when an element is referred to as being 'connected with' another element, the element can be directly connected with the other element or intervening elements may also be present. In contrast, when an element is referred to as being 'directly connected with' another element, there are no intervening elements present.

A singular representation may include a plural representation as far as it represents a definitely different meaning from the context.

Terms 'include' or 'has' used herein should be understood that they are intended to indicate an existence of several components or several steps, disclosed in the specification, and it may also be understood that part of the components or steps may not be included or additional components or steps may further be included.

Portable electronic devices described herein may include cellular phones, smart phones, laptop computers, digital broadcasting terminals, personal digital assistants (PDAs), portable multimedia players (PMPs), navigators, slate PCs, tablet PCs, ultrabooks, wearable devices (for example, smartwatches, smart glasses, head mounted displays (HMDs)), and the like.

However, it may be easily understood by those skilled in the art that the configuration according to the exemplary embodiments of this specification can also be applied to stationary terminals such as digital TV, desktop computers and the like, excluding a case of being applicable only to the portable electronic devices.

FIG. 1 is a block diagram for explaining a portable electronic device related to the present disclosure; Referring to FIG. 1, the portable electronic device 100 may include a wireless communication unit 110, an input unit 120, a sensing unit 140, an output unit 150, an interface unit 160, a memory 170, a controller 180, a power supply unit 190, and the like. FIG. 1 illustrates the portable electronic device having various components, but it may be understood that implementing all of the illustrated components is not a requirement. Greater or fewer components may alternatively be implemented.

In more detail, the wireless communication unit 110 of those components may typically include one or more modules which permit wireless communications between the portable electronic device 100 and a wireless communication system, between the portable electronic device 100 and another portable electronic device 100, or between the portable electronic device 100 and an external server. In addition, the wireless communication unit 110 may include one or more modules for connecting the portable electronic device 100 to one or more networks.

The wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 is typically implemented using one or more sensors configured to sense internal information of the portable electronic device, the surrounding environment of the portable electronic device, user information, and the like. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). The portable electronic device 100 may be configured to utilize information obtained from sensing unit 140, and in particular, information obtained from one or more sensors of the sensing unit 140, and combinations thereof.

The output unit 150 may be configured to output an audio signal, a video signal or a tactile signal. The output unit 150 may include a display unit 151, an audio output unit 152, a haptic module 153, an optical output unit 154 and the like. The display unit 151 may have an inter-layered structure or an integrated structure with a touch sensor in order to facilitate a touch screen. The touch screen may provide an output interface between the portable electronic device 100 and a user, as well as functioning as the user input unit 123 which provides an input interface between the portable electronic device 100 and the user.

The interface unit 160 serves as an interface with various types of external devices that can be coupled to the portable electronic device 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The portable electronic device 100 may execute an appropriate control related to a connected external device, in response to the external device being connected to the interface unit 160.

In addition, the memory 170 stores data supporting various functions of the portable electronic device 100. The memory 170 is typically implemented to store data to support various functions or features of the portable electronic device 100. For instance, the memory 170 may be configured to store application programs executed in the portable electronic device 100, data or instructions for operations of the portable electronic device 100, and the like. At least some of those application programs may be downloaded from an external server via wireless communication. Some others of those application programs may be installed within the portable electronic device 100 at the time of being shipped for basic functions of the portable electronic device 100 (for example, receiving a call, placing a call, receiving a message, sending a message, etc.). On the other hand, the application programs may be stored in the memory 170, installed in the portable electronic device 100, and executed by the controller 180 to perform an operation (or a function) of the portable electronic device 100.

The controller 180 may typically control an overall operation of the portable electronic device 100 in addition to the operations related to the application programs. The controller 180 may provide or process information or functions appropriate for a user in a manner of processing signals, data, information and the like, which are input or output by the aforementioned components, or activating the application programs stored in the memory 170.

Furthermore, the controller 180 may control at least part of the components illustrated in FIG. 1, in order to drive the application programs stored in the memory 170. In addition, the controller 180 may drive the application programs by combining at least two of the components included in the portable electronic device 100 for operation.

The power supply unit 190 may receive external power or internal power and supply appropriate power required for operating respective elements and components included in the portable electronic device 100 under the control of the controller 180. The power supply unit 190 may include a battery, and the battery may be an embedded battery or a replaceable battery.

At least part of those elements and components may be combined to implement operation and control of the portable electronic device or a control method of the portable electronic device according to various exemplary embodiments described herein. Furthermore, the operation and control or the control method of the portable electronic device may be implemented in the portable electronic device in such a manner of activating at least one application program stored in the memory 170.

Hereinafter, each aforementioned component will be described in more detail with reference to FIG. 1, prior to explaining various exemplary embodiments implemented by the portable electronic device 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and/or a terrestrial channel. At least two broadcast receiving modules 111 may be provided in the portable electronic device 100 to simultaneously receive at least two broadcast channels or switch the broadcast channels.

The mobile communication module 112 may transmit/receive wireless signals to/from at least one of network entities, for example, a base station, an external terminal, a server, and the like, on a mobile communication network, which is constructed according to technical standards or transmission methods for mobile communications (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.)

Here, the wireless signals may include audio call signal, video (telephony) call signal, or various formats of data according to transmission/reception of text/multimedia messages.

The wireless Internet module 113 means a module for supporting wireless Internet access. The wireless Internet module 113 may be built-in or externally installed to the portable electronic device 100. The wireless Internet module 113 may transmit and/or receive wireless signals via communication networks according to wireless Internet technologies.

Examples of such wireless Internet access may include Wireless LAN (WLAN), Wireless-Fidelity (Wi-Fi), Wireless Fidelity Direct (Wi-Fi Direct), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), LTE (Long Term Evolution), LTE-A (Long Term Evolution-Advanced), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LET and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the portable electronic device 100 and a wireless communication system, between the portable electronic device 100 and another portable electronic device 100, or between the portable electronic device and a network where another portable electronic device 100 (or an external server) is located, via wireless personal area networks. The short-range communication module 114 denotes a module for short-range communications.

Here, the another portable electronic device 100 may be a wearable device, for example, a smart watch, smart glasses or a head mounted display (HMD), which is able to exchange data with the portable electronic device 100 (or to like data with the portable electronic device 100). The short-range communication module 114 may sense (recognize) a wearable device, which is able to communicate with the portable electronic device), near the portable electronic device 100. In addition, when the sensed wearable device is a device which is authenticated to communicate with the portable electronic device 100 according to the present disclosure, the controller 180 may transmit at least part of data processed in the portable electronic device 100 to the wearable device via the short-range communication module 114. Hence, a user of the wearable device may use the data processed in the portable electronic device 100 on the wearable device. For example, when a call is received in the portable electronic device 100, the user may answer the call using the wearable device. Also, when a message is received in the portable electronic device 100, the user can check the received message using the wearable device.

The location information module 115 is generally configured to detect, calculate, derive or otherwise identify a position of the portable electronic device. As an example, the location information module 115 includes a Global Position System (GPS) module, a Wi-Fi module, or both. For example, when the portable electronic device uses the GPS module, a position of the portable electronic device may be acquired using a signal sent from a GPS satellite. As another example, when the portable electronic device uses the Wi-Fi module, a position of the portable electronic device may be acquired based on information related to a wireless access point (AP) which transmits or receives a wireless signal to or from the Wi-Fi module. According to the need, the location information module 115 may perform any function of the other modules of the wireless communication unit 110 to obtain data on the location of the portable electronic device. As a module used to acquire the location (or current location) of the portable electronic device, the location information module 115 may not be necessarily limited to a module for directly calculating or acquiring the location of the portable electronic device.

Next, the input unit 120 may be configured to provide an audio or video signal (or information) input to the portable electronic device or information input by a user to the portable electronic device. For the input of the audio information, the portable electronic device 100 may include one or a plurality of cameras 121. The camera 121 processes an image frame, such as still picture or video, obtained by an image sensor in a video phone call or image capturing mode. The processed image frames may be displayed on the display unit 151. On the other hand, the plurality of cameras 121 disposed in the portable electronic device 100 may be arranged in a matrix configuration. By use of the cameras 121 having the matrix configuration, a plurality of image information having various angles or focal points may be input into the portable electronic device 100. As another example, the cameras 121 may be located in a stereoscopic arrangement to acquire left and right images for implementing a stereoscopic image.

The microphone 122 may process an external audio signal into electric audio data. The processed audio data may be utilized in various manners according to a function being executed in the portable electronic device 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the portable electronic device 100 to correspond to the input information. The user input unit 123 may include a mechanical input element (or a mechanical key, for example, a button, a dome switch, a jog wheel, a jog switch or the like located on a front/rear surface or a side surface of the portable electronic device 100), and a touch-sensitive input element. As one example, the touch-sensitive input means may be a virtual key, a soft key or a visual key, which is displayed on a touch screen through software processing, or a touch key which is disposed on a portion except for the touch screen. On the other hand, the virtual key or the visual key may be displayable on the touch screen in various shapes, for example, graphic, text, icon, video or a combination thereof.

On the other hand, the sensing unit 140 may sense at least one of internal information of the portable electronic device, surrounding environment information of the portable electronic device and user information, and generate a sensing signal corresponding to it. The controller 180 may control an operation of the portable electronic device 100 or execute data processing, a function or an operation related to an application program installed in the portable electronic device based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the portable electronic device covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may also be categorized as a proximity sensor.

On the other hand, for the sake of brief explanation, a state that the pointer is positioned to be proximate onto the touch screen without contact will be referred to as 'proximity touch,' whereas a state that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving state, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the portable electronic device 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, the touch object body may be a finger, a touch pen or stylus pen, a pointer, or the like as an object through which a touch is applied to the touch sensor.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the portable electronic device 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swype touch, a hovering touch, and the like.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 constructing the input unit 120 may be a type of camera sensor. The camera sensor may include at least one of a photo sensor (or image sensor) and a laser sensor.

The camera 121 and the laser sensor may be combined to detect a touch of the sensing object with respect to a 3D stereoscopic image. More specifically, the photo sensor is integrated with photo diodes and transistors in the rows and columns thereof, and a content placed on the photo sensor may be scanned by using an electrical signal that is changed according to the amount of light applied to the photo diode. Namely, the photo sensor may calculate the coordinates of the sensing object according to variation of light to thus obtain position information of the sensing object.

The display unit 151 may display (output) information processed in the portable electronic device 100. For example, the display unit 151 may display execution screen information of an application program driven in the portable electronic device 100 or user interface (UI) and graphic user interface (GUI) information in response to the execution screen information.

Furthermore, the display unit 151 may also be implemented as a stereoscopic display unit for displaying stereoscopic images.

The stereoscopic display unit may employ a stereoscopic display scheme such as stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. Also, the audio output unit 152 may also provide audible output signals related to a particular function (e.g., a call signal reception sound, a message reception sound, etc.) performed by the portable electronic device 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be configured to transmit tactile effects through a user's direct contact, or a user's muscular sense using a finger or a hand. The haptic module 153 may be implemented in two or more in number according to the configuration of the portable electronic device 100.

An optical output module 154 may output a signal for indicating an event generation using light of a light source. Examples of events generated in the portable electronic device 100 may include a message reception, a call signal reception, a missed call, an alarm, a schedule notice, an email reception, an information reception through an application, and the like.

A signal output by the optical output module 154 may be implemented in such a manner that the portable electronic device emits monochromatic light or light with a plurality of colors. The signal output may be terminated as the portable electronic device senses that a user has checked the generated event, for example.

The interface unit 160 serves as an interface for external devices to be connected with the portable electronic device 100. The interface unit 160 may allow a data reception from an external device, a power delivery to each component in the portable electronic device 100, or a data transmission from the portable electronic device 100 to an external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an 'identifying device') may take the form of a smart card. Accordingly, the identifying device may be connected with the terminal 100 via the interface unit 160.

Also, the interface unit 160 may serve as a path for power to be supplied from an external cradle to the portable electronic device 100 when the portable electronic device 100 is connected to the external cradle or as a path for transferring various command signals inputted from the cradle by a user to the portable electronic device 100. Such various command signals or power inputted from the cradle may operate as signals for recognizing that the portable electronic device 100 has accurately been mounted to the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the portable electronic device 100 may operate a web storage which performs the storage function of the memory 170 on the Internet.

As aforementioned, the controller 180 may typically control the general operations of the portable electronic device 100. For example, the controller 180 may set or release a lock state for restricting a user from inputting a control command with respect to applications when a state of the portable electronic device meets a preset condition.

Furthermore, the controller 180 may also perform controlling and processing related to voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the portable electronic device 100.

The power supply unit 190 may receive external power or internal power and supply appropriate power required for operating respective elements and components included in the portable electronic device 100 under the control of the controller 180. The power supply unit 190 may include a battery, which is typically rechargeable or be detachably coupled to the terminal body for charging.

Furthermore, the power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof.

Hereinafter, a method of generating a summary of video data in a portable electronic device including at least one of the foregoing components described with reference to FIG. 1 will be described.

Figure 2:
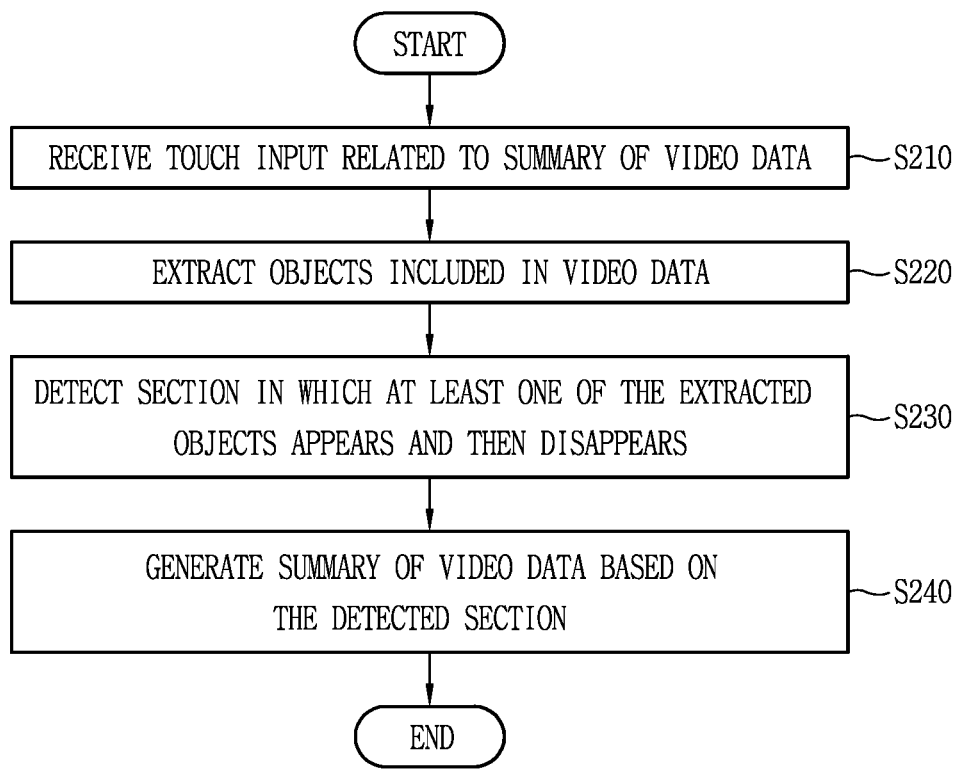
FIG. 2 is a flowchart illustrating a method of generating a summary of a video in a portable electronic device related to the present disclosure.
Figure 3A:
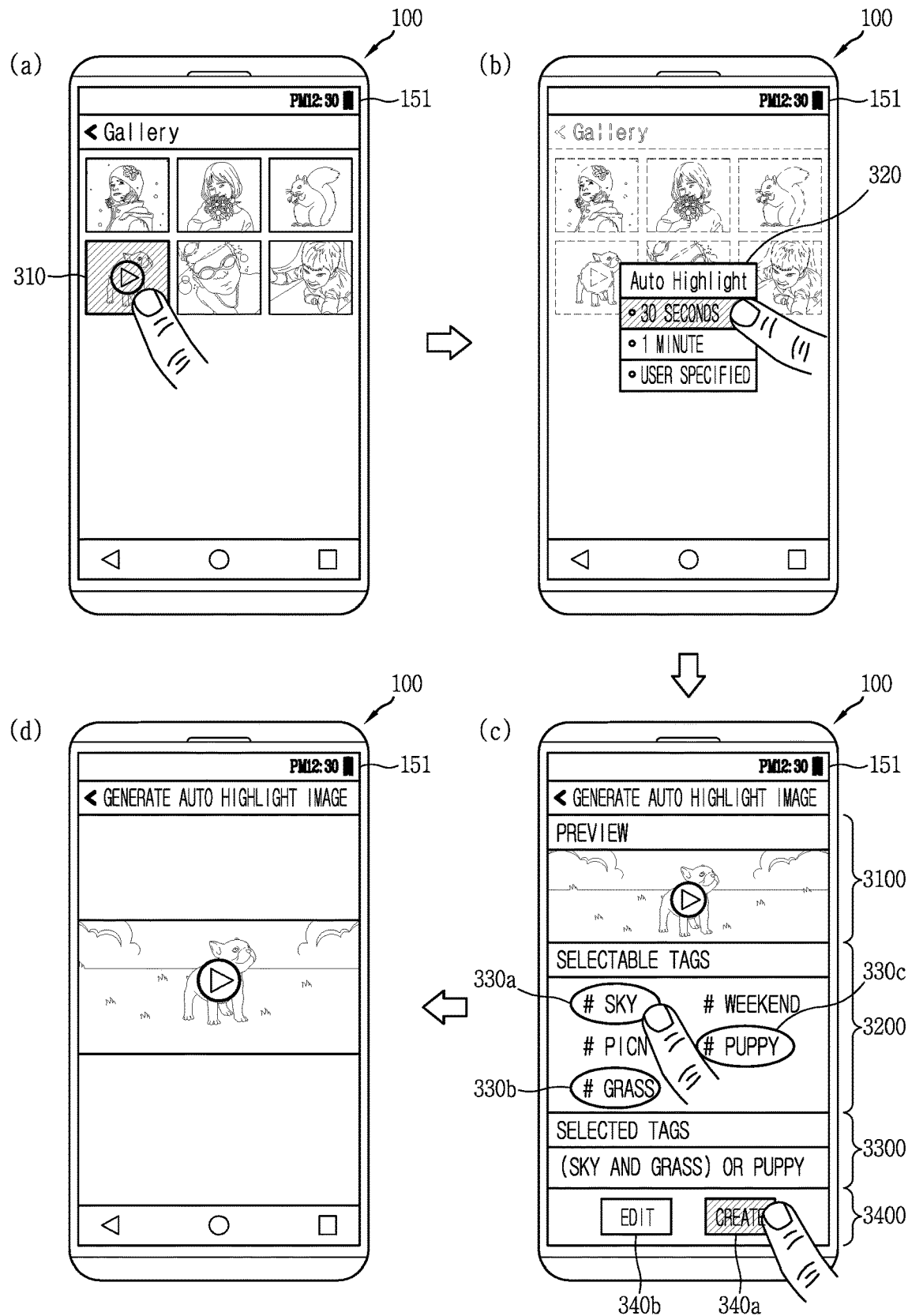
Figure 3B:
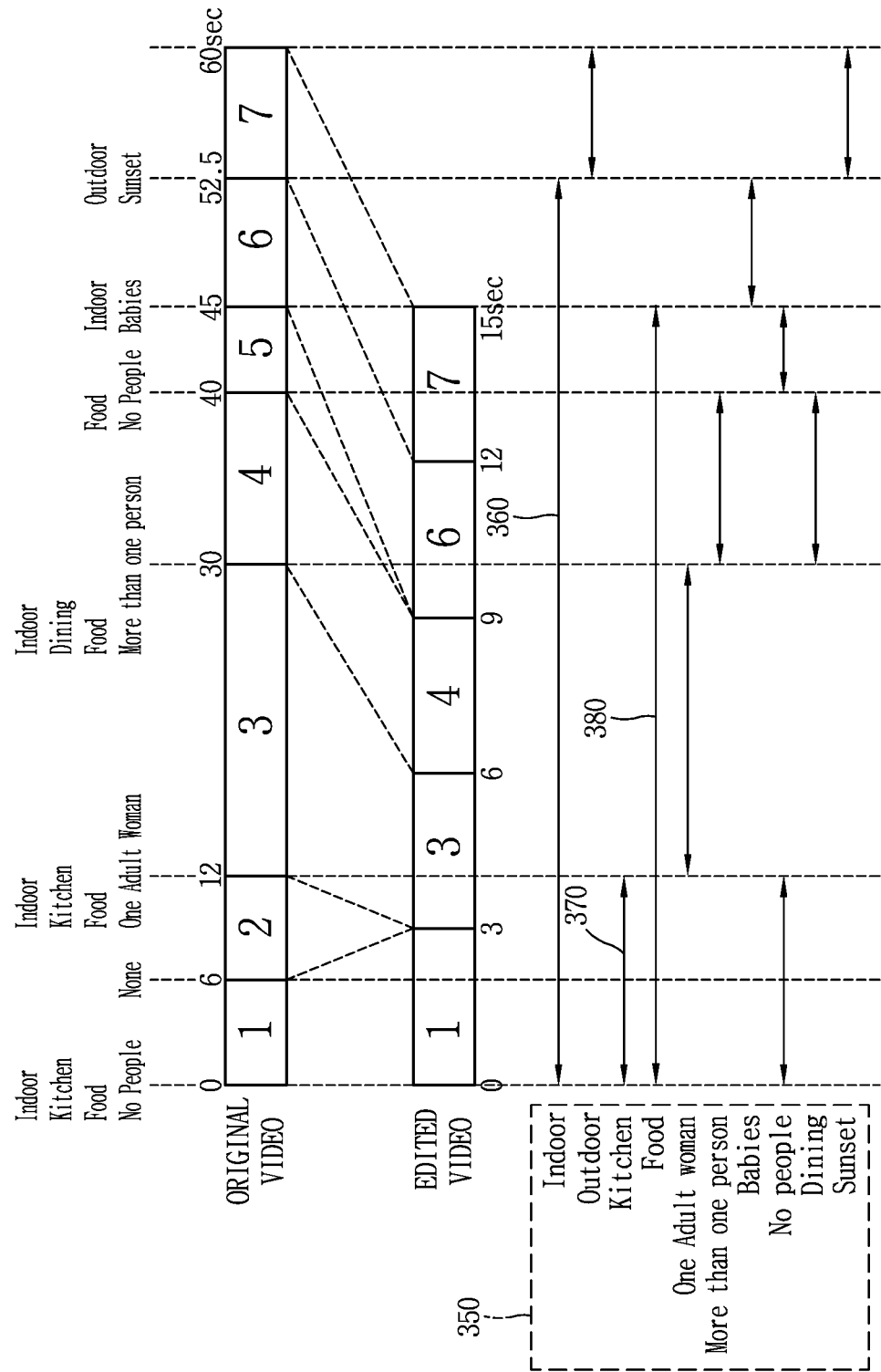

FIG. 2 is a flowchart illustrating a method of generating a summary of a video in a portable electronic device related to the present disclosure, and FIGS. 3A through 3C are conceptual views for explaining the flowchart of FIG. 2.

On the other hand, in the following description, the generation of a summary of video data will be illustrated, but the present disclosure may not be necessarily limited thereto. In other words, video data illustrated in the following description may be replaced with a graphics image, an animation or audio data.

Referring to FIG. 2, the portable electronic device according to the present disclosure may receive a touch input related to a summary of video data (S210).

First, the controller 180 may execute a gallery application that performs an output function of video data in response to a user request. The gallery application is an application program that provides a function of displaying a thumbnail image corresponding to at least one video data on the display unit 151.

The gallery application may be carried out by a user request. For example, the controller 180 may execute a gallery application in response to a touch input applied to a gallery icon of the gallery application.

As illustrated in FIG. 3A(a), when a gallery application is carried out, the controller 180 may display a thumbnail image 310 indicating video data. The thumbnail image may be a representative image indicating video data or an image on which any one of images included in a video is displayed in a reduced size.

The video data displayed through the gallery application may be data stored in the memory 170 or an external server. When the video data is stored in the external server, the controller 180 may access the video data stored in the external server through communication. The video data may include video data stored in a memory by an operator of the portable electronic device, video data selected from a portion of a specific video, video data captured by a camera, or the like.

Meanwhile, the controller 180 may receive a touch input related to a summary of video data. For example, as illustrated in FIG. 3A(a), a preset type of touch may be received for a thumbnail image 310 indicating video data. The preset type of touch may be a long touch, a force touch having a touch intensity above a reference intensity, or the like.

In this case, the controller 180 may execute a summary function for generating a summary that summarizes the video data in response to a touch input related to a summary of the video data.

On the contrary, when a touch input other than the preset type of touch is applied to the thumbnail image 310 indicating video data, the controller 180 may execute a video data playback function instead of a summary function. For example, when a short touch is applied to the thumbnail image 310 indicating video data, the controller 180 may play the video data.

When a summary function is carried out, the controller 180 may extract objects included in video data (S220).

The controller 180 may divide the video data into a plurality of frames with a preset time period. For example, as illustrated in FIG. 3B, the controller 180 may divide the video data into seven frames with a time period of one second.

The controller 180 may calculate a scene detection result for each of the plurality of frames based on a scene detection technology. The scene detection technology is a technology for detecting objects constituting an image of a frame. Such a scene detection technology is well known in the art, and thus the detailed description thereof will be omitted in order not to obscure the gist of the present disclosure.

The object is graphic objects included in an image. Such an object may include a thing or person, a place corresponding to the background (a kitchen, a living room, a classroom, an ocean or the like), a background condition (day or night or sunset, indoor or outdoor), and the like. Furthermore, the controller 180 may also extract the attribute information of an object based on a scene detection technology. The attribute information of an object includes a number of objects, an age, a type, and a motion of a person (hug or greeting, etc.).

For example, as illustrated in FIG. 3B, the controller 180 may detect objects 350 corresponding to at least one of indoor or outdoor, kitchen, food, one adult woman, more than one person, babies, no people, dining, and sunset based on a video scene detection technology.

When objects are extracted for each frame, the controller 180 may detect a section in which at least one of the extracted objects appears and then disappears (S230).

First, the controller 180 may select at least one object to be included in a video summary based on the user's control command. For example, the controller 180 may detect a section in which at least one object selected by the user's control command among the plurality of objects included in a video appears and then disappears.

Alternatively, the controller 180 may select at least one of objects included in video data based on a priority condition. In other words, the controller 180 may select a preset number of at least one object in order of higher priorities.

The priority condition may be determined based on a category condition of an object, a use frequency condition of tags used on an SNS, and the like.

For example, the controller 180 may assign a higher priority to an object corresponding to a place category than an object corresponding to a person category. In other words, the controller 180 may assign a priority to a frame having a visually higher importance, such as a transition of place, rather than a person's emergence and exit during the generation of a video summary. The priority of each category may be set in advance.

For another example, as a use frequency of a tag used on a social network service (SNS) increases, the controller 180 may set the priority of an object corresponding to the tag to be higher. In other words, in the case of an object corresponding to a tag frequently used by a user, the controller 180 may estimate it as an object with the user's high interest to set a high priority during the generation of a video summary. Accordingly, the present disclosure may generate a user-customized video summary according to the user's interest.

When at least one object is selected, the controller 180 may detect a section in which the selected at least one object appears and then disappears.

More specifically, the controller 180 may extract objects for each of a plurality of frames based on a scene detection technology in order to detect a section in which the at least one object appears and then disappears. Furthermore, the controller 180 may detect a section in which each of objects included in video data appears and then disappears using result data extracted from the objects.

For this purpose, the controller 180 may calculate result data for each object for the plurality of frames as shown in table of FIG. 3C. In other words, the controller 180 may set the columns of a table indicating result data as a plurality of frames and the columns thereof as objects to calculate the result data corresponding to each row and column. For example, for a first frame, the controller 180 may calculate result data for an aircraft and an animal, respectively.

Furthermore, referring to Table of FIG. 3C, the controller 180 may detect a frame in which result data is changed for each object. The controller 180 may determine the changed frame as one of a frame in which a specific object appears or a frame in which the specific object disappears.

Here, a frame in which result data is changed may be detected by various conditions. More specifically, the frame in which result data is changed may be a frame in which a difference value of result data between adjacent frames is larger than a predetermined value or a frame in which result data is different by at least a predetermined value based on a reference value set for each object. In addition, based on various conditions, a frame in which the result data is changed may be detected.

For example, as illustrated in FIG. 3C, it is seen that result data of an object corresponding to architecture is changed between a sixth frame and a seventh frame. In this case, the controller 180 may determine a 0th frame as an emergence frame of the architecture and a sixth frame as an exit frame of the architecture. Accordingly, the controller 180 may detect a section in which the architecture appears and then disappears as a section from the 0th frame to the sixth frame.

Through this, the controller 180 may detect a section constituting at least one frame between a frame in which the object appears (i.e., an emergence frame of the object) and a frame in which the object disappears (i.e., an exit frame of the object) as a section in which the object appears and then disappears.

On the other hand, in the above description, a section in which an object appears and then disappears has been described as a section in which a thing or person appears and then disappears, but the present disclosure is not limited to this.

In other words, a section in which an object in the present disclosure appears and then disappears may include a section in which a situation of background is transitioned (i.e., a transition of scene) and a section in which a background place is transitioned from place A to place B.

For example, when a change of result data is detected between a sixth frame and a seventh frame for an object corresponding to indoor, the controller 180 may detect a section from the 0th frame, which is an initial frame, to the sixth frame as a section in which the object corresponding to indoor appears and then disappears. In addition, the controller 180 may determine that a scene transition has occurred between frame 6 and frame 7.

For another example, when a change of result data is detected between a second frame and a third frame, and a sixth frame and a seventh frame for an object corresponding to kitchen, the controller 180 may detect a section from the third frame to the seventh frame as a section in which the object corresponding to kitchen appears and then disappears. In this case, the controller 180 may determine that a place transition has occurred between the second frame and the third frame, and between the seventh frame and the eighth frame.

As described above, the controller 180 may detect a section in which an object appears and then disappears for each object using a scene transition technology, thereby determining a time point in the emergence and exit of an object, a transition of scene or a transition of place without tracking a specific object included in a video for every moment.

On the other hand, the controller 180 may detect a section in which two or more objects appear and then disappear according to a user's control command. At this time, the control unit 180 may set an operation condition of a section in which two or more objects appear and then disappear based on the user's control command.

The operation condition includes an AND operation condition for detecting a section in which two or more objects appear and then disappear with an AND operation, and an OR operation condition for detecting a section in which two or more objects appear and then disappear with an OR operation.

The AND operation condition is a condition in which two or more objects appear and then disappear at the same time. For example, when an AND operation condition is set for 'sky' and 'woman', the controller 180 may detect a section in which 'sky' and 'woman' appear and then disappear at the same time.

The OR operation condition is a condition in which at least one object among two or more objects appears and then disappears. For example, when an OR operation condition is set for 'sky' and 'grass', the controller 180 may detect a section in which only 'sky' appears and then disappears, a section in which only 'grass' appears and then disappears, and a section in which 'sky' and 'grass' appear and then disappear at the same time.

When a section in which at least one object appears and then disappears, the controller 180 may generate a summary of video data based on the detected section (S240).

First, the controller 180 may set a playback time of a summary based on the user's request. The playback time of the summary may be preset or may be set by the user. For example, the playback time of the summary may be set to 30 seconds or 1 minute. For another example, the controller 180 may set the playback time of the summary to 2 minutes and 30 seconds based on the user's control command.

Then, the controller 180 may edit the detected section. More specifically, the controller 180 may increase or decrease at least one of a playback speed and a playback time of a partial section of the detected section, thereby generating a video summary having the preset playback time. For example, the controller 180 may delete some of a plurality of frames constituting the detected section to reduce an entire playback time of the detected section. for another example, the controller 180 may adjust a playback speed of the detected section to be two times slower, thereby increasing a playback time of the detected section. The function of slowing down a playback speed may be referred to as a slow motion function.

The controller 180 may increase or decrease at least one of a playback time and a playback speed of the detected section based on a priority condition during the detected section. In other words, the controller 180 sets the playback time to be longer for a higher priority condition and shorter for a lower priority condition. Here, the priority condition is the same as the foregoing priority condition.

Alternatively, the controller 180 may increase or decrease at least one of a playback time and a playback speed of the detected section based on a priority condition during the detected section. For example, the controller 180 may increase or decrease at least one of a playback speed and a playback time of the detected section based on the user's control command. For another example, the controller 180 may increase or decrease a capacity of the detected section based on the user's control command.

Subsequent to editing the detected section, the controller 180 may subsequently paste the edited section to generate a summary containing the edited section.

The controller 180 may subsequently paste frames included in the edited section to frames included in original video data in the playback order of the frames to generate a summary. For example, when a first frame and a second frame are included in the edited section, the controller 180 may determine the order of playback time points of the original video data of each frame, and subsequently paste the first frame and the second frame such that a frame having a preceding playback time point of the original video data is played back first according to the determination result.

At this time, when there exists a duplicate frame among frames included in the edited section, the controller 180 may delete the duplicate frame to generate a summary. For example, when the second frame is included in both the first detection section and the second detection section, the controller 180 may generate a summary including the second frame only once.

Alternatively, the controller 180 may sequentially paste the detected regions according to the priority of the object to generate a summary. In other words, the controller 180 may generate a summary such that a section including an object having a high priority is played back first. In this case, when there exist a plurality of objects in a specific section, the priority of the specific section may be determined based on a sum of priorities of the plurality of objects. Through this, the present disclosure may induce a user's interest from an initial playback section of the summary.

On the other hand, when the edited section is subsequently pasted, the controller 180 may add a preceding and subsequent frame located prior to and subsequent to each section. Through this, the present disclosure may provide a more natural scene transition between sections.

The controller 180 may generate a plurality of summaries having different playback sections based on the user's control command. For example, the controller 180 may edit the detected section to generate a 30 second, 2 minute, and 4 minute summary. Accordingly, the user may be provided with a summary having various playback times.

In addition, the controller 180 may set different filter functions during sections in which each object appears and then disappears for each object included in the summary. The filter function is a function of setting a preset visual effect (for example, a black and white image setting, a sepia image setting, etc.) to an image. For example, the controller 180 may set a blue filter function to emphasize the blue of an ocean in a section including the ocean. Through this, the present disclosure may automatically set an appropriate filter function for each object to generate a summary.

In the above, a method of allowing a portable electronic device according to the present disclosure to generate a summary of video data has been described. Hereinafter, a user interface for generating such a summary will be described in more detail with reference to FIG. 3A.

As illustrated in FIG. 3A(a), when a preset type of touch is applied to a thumbnail image indicating video data, the controller 180 may perform a summary function that summarizes the video data.

As illustrated in FIG. 3A(b), when the summary function is carried out, the controller 180 may display a selection list 320 for selecting a playback time of the summary. The selection list 320 may include an item indicating a preset playback time (30 seconds or 1 minute) and a user-specified item allowing a user to directly select a playback time. The user may select a playback time included in the selection list 320 to set the playback time of the summary. For example, as illustrated in FIG. 3A(b), when a touch input is applied to an item indicating 30 seconds, the controller 180 may set the playback time of the summary.

As illustrated in FIG. 3A(c), the controller 180 may display an execution screen of a summary function subsequent to setting the playback time of the summary.

The execution screen of the summary function may include a first region 3100 displaying a preview of a summary, a second region 3200 displaying a tag corresponding to an object included in the video data, a third region 3300 displaying objects selected by the user, and a fourth region 3400 displaying icons for editing or creating a summary.

The tag corresponding to an object included in the video data is a keyword or classification information given as meta data of the object extracted using a scene detection technology. The tag corresponding to such an object may be a name of the object, a place related to the object, a date related to the object, situation information indicated by the object, and the like. For example, as illustrated in FIG. 3A, the tag corresponding to the object may be 'sky', 'weekend', 'picnic', 'puppy', 'grass', and the like.

The controller 180 may select at least one object among objects included in video data based on a touch input to tags corresponding to the object. For example, as illustrated in FIG. 3A(c), the controller 180 may select an object indicated by each tag based on a touch input to 'sky 330*a*', 'grass 330*b*' and 'dog 330*c*'. In this case, the selected objects may be displayed in the third region 3300 as illustrated in FIG. 3A(c).

When at least one object is selected, the controller 180 may detect a section in which the selected at least one object appears and then disappears. Then, the controller 180 may generate a summary of video data based on the detected section based on the user's control command. For example, as illustrated in FIG. 3A(c), in response to a touch input to a generation icon 340*a* indicating a summary generation function, the controller 180 may generate a summary based on a section in which the selected at least one object appears and then disappears.

As illustrated in FIG. 3A(d), when a summary of video data is generated, the controller 180 may display the generated summary of video data on the display unit 151. Furthermore, the controller 180 may play the generated summary of video data. Thus, the user may immediately check a summary subsequent to generating the summary.

Meanwhile, according to the present disclosure, a summary function may be applicable not only to a video stored in the memory but also to a video currently being captured through the camera 121. In this case, the controller 180 may generate a video summary according to a user's request for generating a summary or may automatically generate a video summary without a user's request. For example, the controller 180 may execute a summary function in the background when a video is captured through the camera 121.

In other words, when the capturing of a video is completed through the camera 121, the controller 180 may generate original data of the captured video together with a summary of the captured video data to store them in the memory.

In the above, a method of generating a summary of video data has been described. The present disclosure may generate a video summary including a key portion or interesting portion of a video, thereby inducing a user's interest as well as effectively providing the content of the video through the summary.

[How to Set Operation Condition for Detecting Section]

Figure 4:
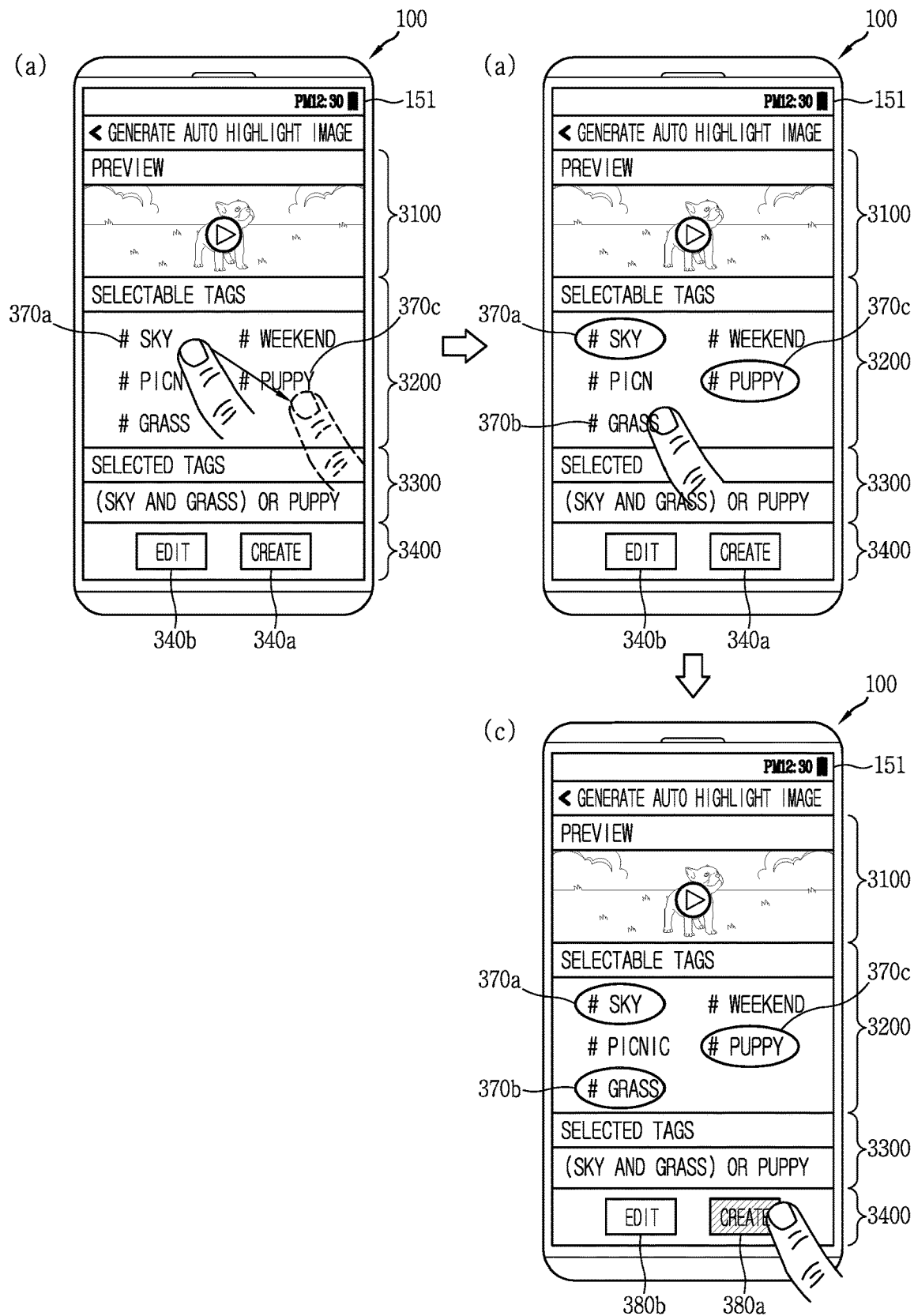
FIG. 4 is a conceptual view illustrating a method of setting an operation condition for detecting a section in which two or more objects appear and then disappear.

Hereinafter, a method of setting an operation condition for detecting a section in which two or more objects appear and then disappear to generate a summary of video data will be described. FIG. 4 is a conceptual view illustrating a method of setting an operation condition for detecting a section in which two or more objects appear and then disappear.

Referring to FIG. 4A, the controller 180 may display tags corresponding to objects included in video data on a second region 3200 of the display unit 151. The controller 180 may select at least one of the objects based on the user's touch input.

When two or more objects are selected based on the user touch input, the controller 180 may set an operation condition for detecting a section in which two or more objects appear and then disappear according to a different touch input to a tag corresponding to each object. Here, the operation condition may be any one of an AND operation and an OR operation.

For example, as illustrated in FIG. 4A, when a drag input started from a region 370a and ended at a region 370c displayed with 'puppy' is applied, the controller 180 may set an AND operation as an operation condition for detecting a section in which 'sky' and 'puppy' appear and then disappear. In this case, the controller 180 may detect a section in which 'sky' and 'puppy' appear and then disappear at the same time based on the AND operation.

For another example, as illustrated in FIG. 4B, when a short touch input is applied to a region 370b displayed with 'grass' while 'sky' and 'puppy' are selected, the controller 180 may set an OR operation as an operation condition for detecting a section in which 'sky', 'puppy' and 'grass' appear and then disappear. In this case, the controller 180 may detect a section in which only 'sky' and 'dog' appear and then disappear at the same time, a section in which only 'grass' appears and then disappears, and a section in which 'sky', 'puppy' and 'grass' appear and then disappear at the same time.

In other words, according to the present disclosure, it may be possible to conveniently set an operation condition for detecting a section in which two or more objects appear and then disappear by changing a type of touch input to tags corresponding to objects.

On the other hand, as illustrated in FIG. 4B, the controller 180 may display a selected object and a non-selected object in a visually distinguished manner. Thus, the user may visually check the selected object.

When an operation condition is set, the controller 180 may display information on the operation condition in the third region 3300. For example, as illustrated in FIG. 4B or 4C, in the third region 3300, an AND operation may be displayed between 'sky' and 'puppy', and an OR operation may be displayed between 'sky' and 'grass'. Therefore, the user may check operation conditions at a glance for which sections in which each object appears and then disappears are detected.

As illustrated in FIG. 4C, when a touch input is applied to an icon 380a for generating a summary of video data, the controller 180 may generate a summary based on the detected section. In the above, a method of setting an operation condition for detecting a section in which two or more objects appear and then disappear has been described. Through this, the present disclosure may more conveniently set various operation conditions and generate a video summary in various forms when detecting a section including a plurality of objects.

[How to Provide Previews of Plurality of Summaries]

Hereinafter, a method of displaying and editing previews of a plurality of summaries having different playback times will be described. FIGS. 5A through 5E are conceptual views illustrating previews of a plurality of summaries having different playback times.

Figure 5A:
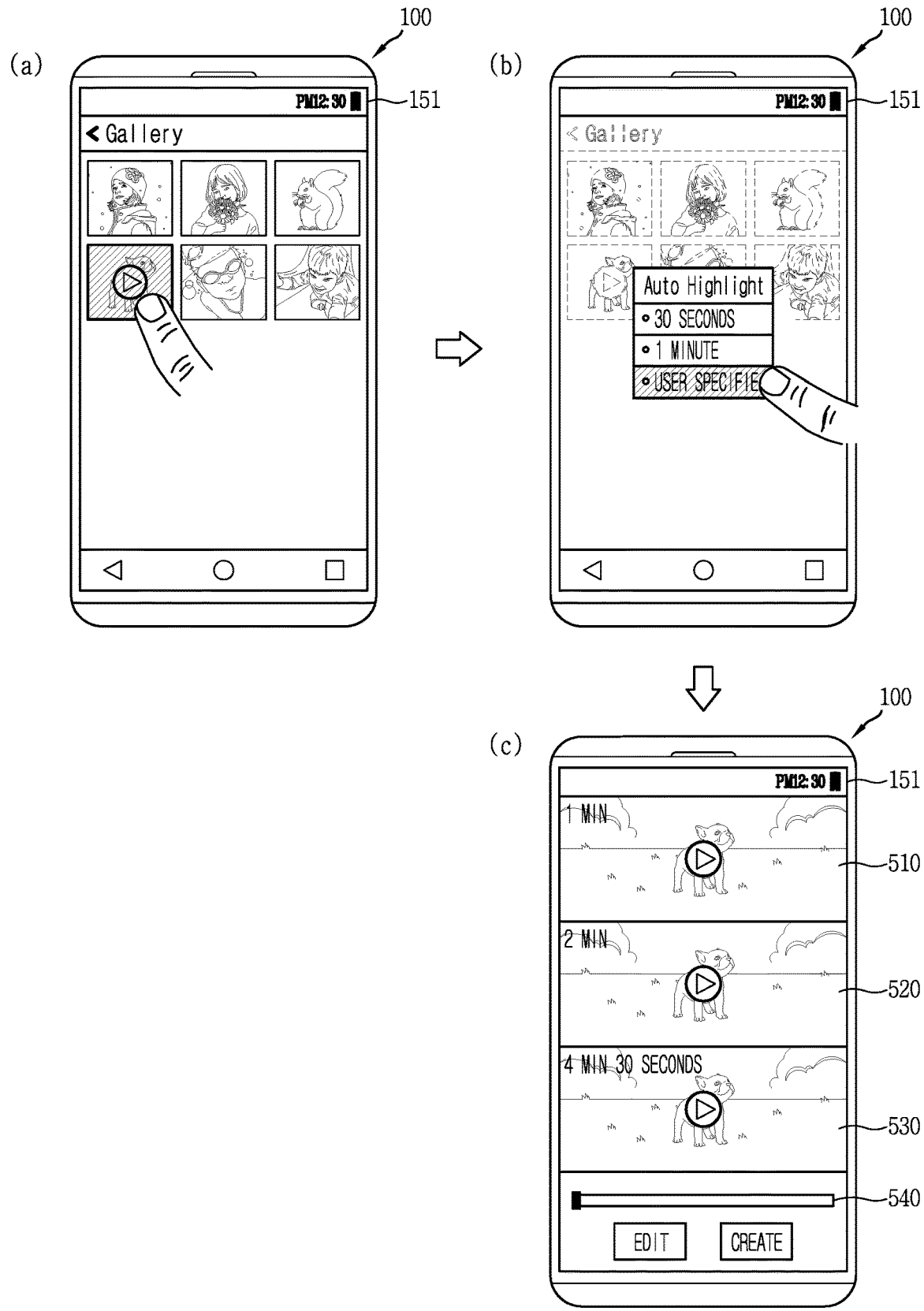
FIGS. 5A through 5E are conceptual views illustrating previews of a plurality of summaries having different playback times.
Figure 5B:
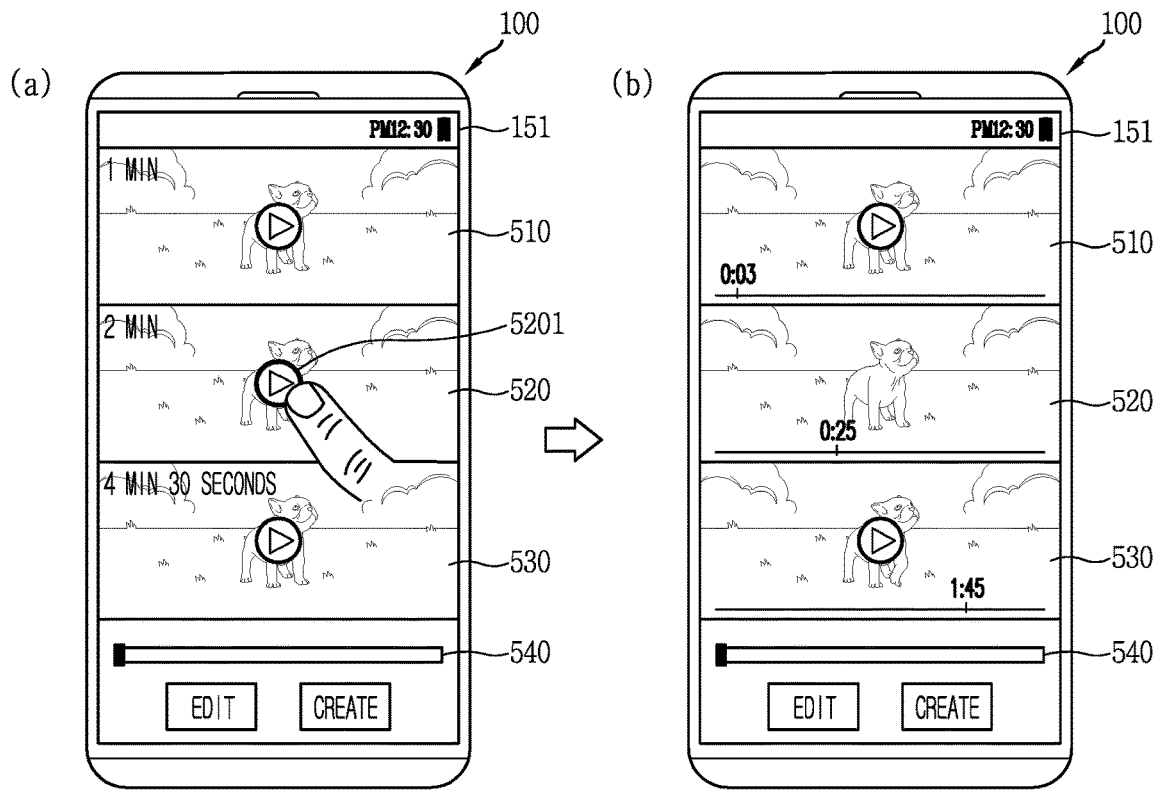

Referring to FIGS. 5A and 5B, when a touch input is applied to a user-specified item for directly setting a playback time of a summary of video data, the controller 180 may generate a plurality of summaries having different playback times to help the user generate a summary. For example, the plurality of summaries may be set to playback times of 1 minute, 2 minutes, 4 minutes and 30 seconds, respectively.

Furthermore, as illustrated in FIG. 5A(c), the controller 180 may display previews 510, 520, 530 of the generated plurality of summaries at the same time on the display unit 151. In other words, the plurality of summaries may be displayed on different regions, respectively. The user may be provided with previews of a plurality of summaries having preset playback times to check content included in a summary according to the playback time. In addition, the user may check previews of a plurality of summaries on one screen to compare contents included in the summaries according to the playback times. Through this, the present disclosure may help the user in setting a playback time directly.

On the other hand, when any one of the plurality of summaries is played back, the controller 180 may play part of the remaining summaries at the same time. At this time, the remaining summaries may be played back at a playback time corresponding to the playback time of the any one summary. Here, a playback time corresponding to the playback time of the any one summary may be a playback time at which an image identical to an image displayed at the playback time corresponding to the playback time of the any one summary is displayed or a playback time at which an image set to be played back prior to and subsequent to an image displayed at the playback time of the any one summary is displayed.

More specifically, referring to FIG. 5B(a), the controller 180 may play a second summary 520 based on a touch input being applied to a graphic object 5201 for the playback of the second summary 520 among a first summary 510, the second summary 520, and a third summary 530.

At this time, the controller 180 may play the sections of the first summary 510 and the third summary 530 at a playback time corresponding to a playback time of the second summary 520, along with the playback of the second summary 520. For example, as illustrated in FIG. 5B(b), when a section having a playback time of 0:25 seconds of the second summary 520 is being played back, the controller 180 may play a section having a playback time of 0:03 seconds of the first summary 510 along with a section having a playback time of 1:45 seconds of the third summary 530. Through this, according to the present disclosure, the user may conveniently compare the contents of summaries having different playback times.

Similarly, when any one of a plurality of summaries is moved to a specific playback time, the controller 180 may move the playback times of the remaining summaries together in response to the user's control command. For example, as shown in (a) of FIG. 5C, when the playback time of the second summary 520 is moved to 0:25 seconds, the controller 180 may move the playback time of the first summary 510 to 0:03 seconds, and the playback time of the third summary 530 to 1:45 seconds.

Figure 5C:
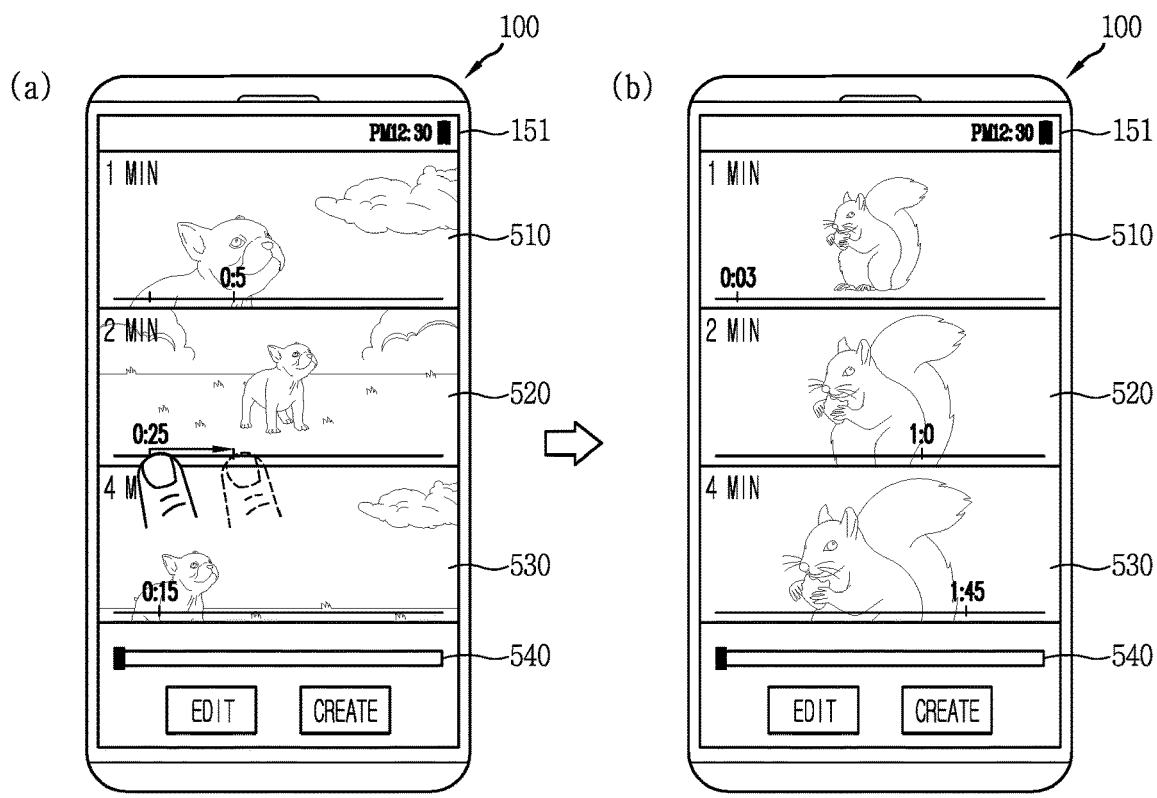

In this case, as illustrated in FIG. 5C(b), the controller 180 may display an image corresponding to the moved playback time. Thus, the user may conveniently compare the contents of a plurality of summaries without playing a summary.

On the other hand, the controller 180 may display a preview image of a plurality of summaries in a manner different from those of FIGS. 5A through 5C. More specifically, the controller 180 may extract different portions between a plurality of summaries to provide them in the form of thumbnails or a separate video.

For this purpose, the controller 180 may extract a video included in the remaining summaries with a summary having the shortest playback time as a reference video. In other words, it is assumed that a summary having the shortest playback time is all included in a video having a long playback time.

Furthermore, the controller 180 may display a reference video and an added video in a visually distinguished manner.

Figure 5D:
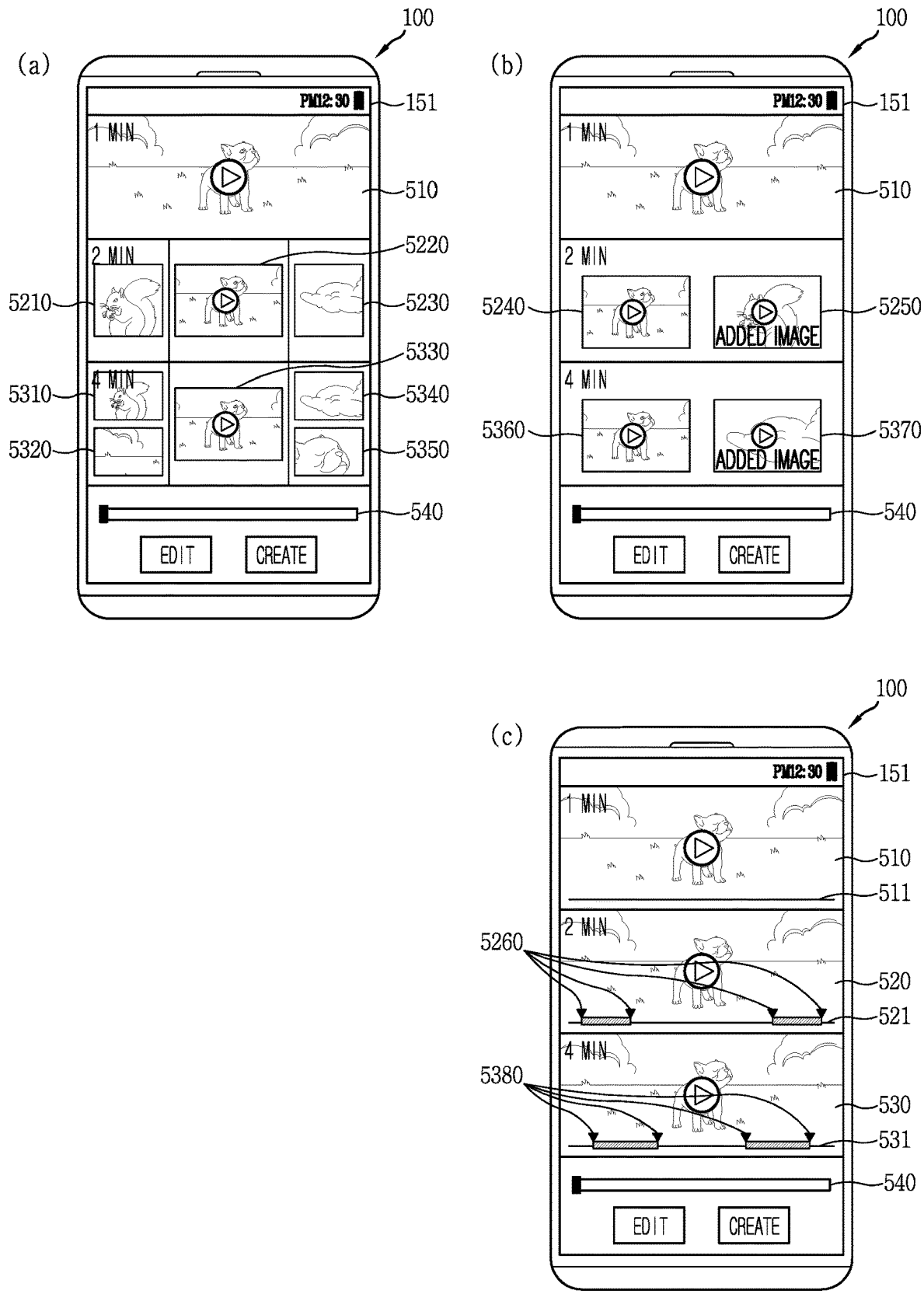

For example, as illustrated in FIG. 5D(a), the controller 180 may set the first summary 510 having the shortest playback time as a reference video. In addition, the controller 180 may display the second summary 520 as a thumbnail image 5220 indicating a reference video and thumbnail image 5210, 5230 indicating an added video. At this time, the reference video may be displayed in the form of video playback, and the added video may be displayed as a still image.

In addition, the controller 180 may set the display position of a thumbnail image indicating the added video according to the playback time of the added video. For example, when a video added from original video data is ahead of the playback time of the reference video, the controller 180 may display the thumbnail image 5210 indicating the added video in a left region with respect to a region displayed with the reference video. On the contrary, the controller 180 may display the thumbnail image 5230 indicating the added video in a right region with respect to a region displayed with the reference video. Therefore, the user may check not only contents added between a plurality of summaries but also the playback time of each content.

Likewise, in the case of the third summary 530, it may be displayed with thumbnail images 5310, 5320, 5340, 5350 indicating the added video and a thumbnail image 5330 indicating the reference video.

Meanwhile, the controller 180 may display the added image as a video. In addition, as illustrated in FIG. 5D(b), the controller 180 may display the second summary 520 as a thumbnail image 5240 indicating a reference video and thumbnail images 5210, 5250 indicating an added video. In this case, the added video may be displayed as a video, and only the added video may be played back alone. Similarly, the controller 180 may display the third summary 530 as a thumbnail image 5360 indicating a reference video and a thumbnail image 5370 indicating an added video.

Alternatively, the controller 180 may display a portion including the added video on a progress bar of the video. The progress bar is a graphic object that indicates a current playback time and a total playback time of the video. For example, as illustrated in FIG. 5D(c), the controller 180 may display progress bars 511, 521, 531 on the preview images of a plurality of summaries.

The controller 180 may display a section in which the added video is played back on the playback bar of each summary. For example, as illustrated in FIG. 5D(c), the controller 180 may display a graphic object 5260 indicating a playback section of the added video on the progress bar 521 of the second summary 520. Similarly, the controller 180 may display a graphic object 5380 indicating a playback section of the added video on the progress bar 531 of the third summary 530.

Figure 5E:
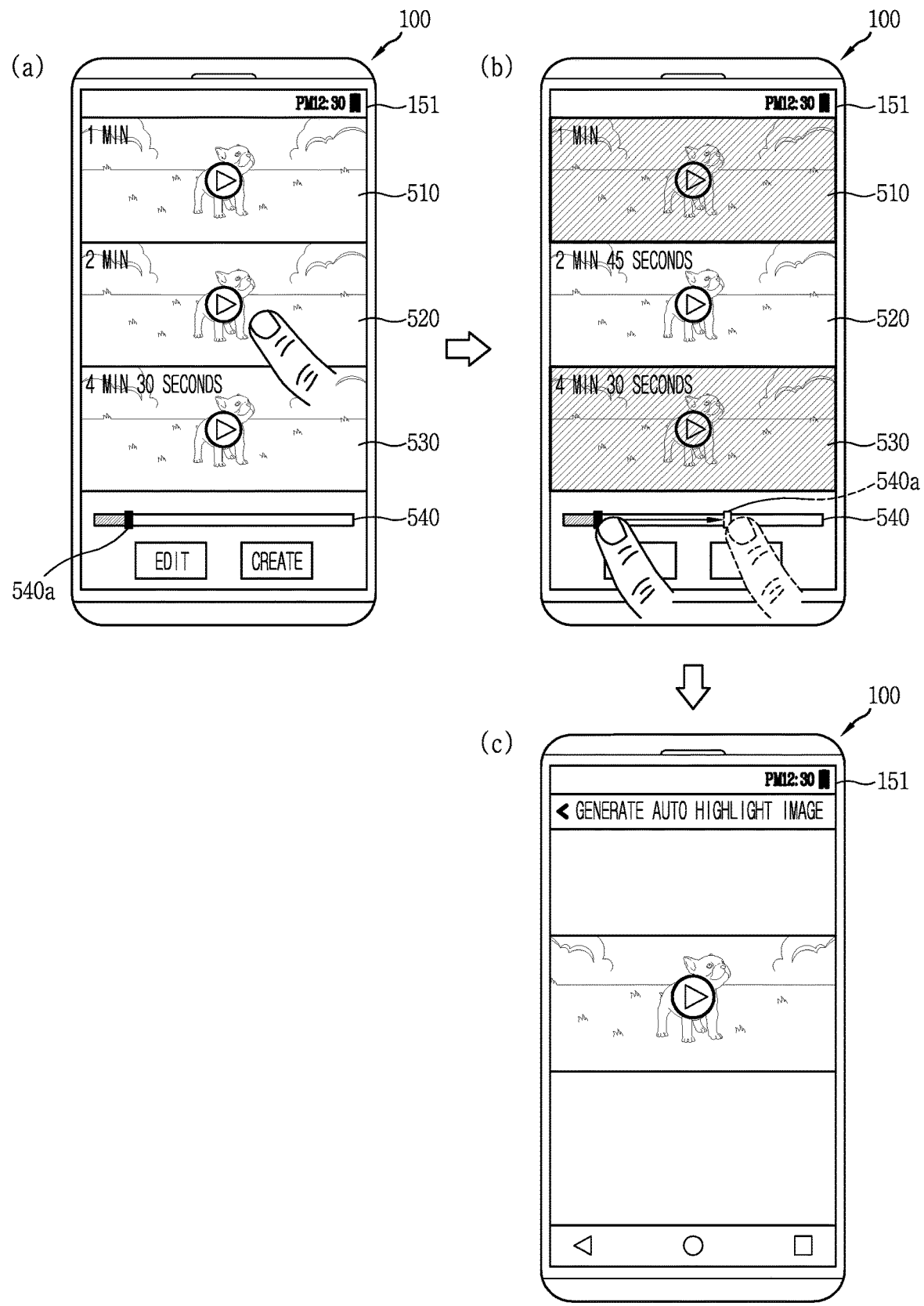

On the other hand, as illustrated in FIG. 5E, the controller 180 may change the playback time of a specific summary based on a user request while previews of a plurality of summaries are being displayed. To this end, as illustrated in FIG. 5E(a), the controller 180 may display a setting bar 540 for setting a playback time in one region of the display unit 151. The setting bar 540 may have a length corresponding to a total playback time of a summary, and a graphic object 540a indicating a current playback time set in the summary may be displayed at a position corresponding to the current playback time set in the summary.

Accordingly, the user may change the playback time of a specific summary using the setting bar 540.

More specifically, as illustrated in FIG. 5E(a), in response to a touch input being applied to a region displayed with the second summary 520, the controller 180 may change the second summary 520 to a state in which a playback time change is allowable. In this case, as illustrated in FIG. 5E(b), the controller 180 may display the second summary 520 and the first and third summaries 510, 530 in a visually distinguished manner.

As illustrated in FIG. 5E(b), when a drag input is applied to the graphic object 540a indicating a current playback time (i.e., 2 minutes) set in the summary, the controller 180 may display the graphic object 540a at a position from which the drag input is released. Then, the controller 180 may change the playback time of the second summary to a playback time corresponding to a position displayed with the graphic object 540a. For example, the controller 180 can change the playback time from 2 minutes to 2 minutes and 45 seconds.

Then, when a touch input is applied to an icon 380a for generating a summary, the controller 180 may generate a summary having a playback time of 2 minutes and 45 seconds. In this case, as the playback time increases, the controller 180 may automatically detect additional images to generate a summary or decrease a playback speed of some sections to generate a summary. Thus, the user may more conveniently edit a summary using the previously generated summary.

In the above, a method of displaying and editing a plurality of summaries has been described. Through this, the present disclosure may compare a plurality of summaries at a glance to easily generate his or her desired summary.

[Generation of Summary of Plurality of Images Satisfying Preset Condition]

Figure 6A:
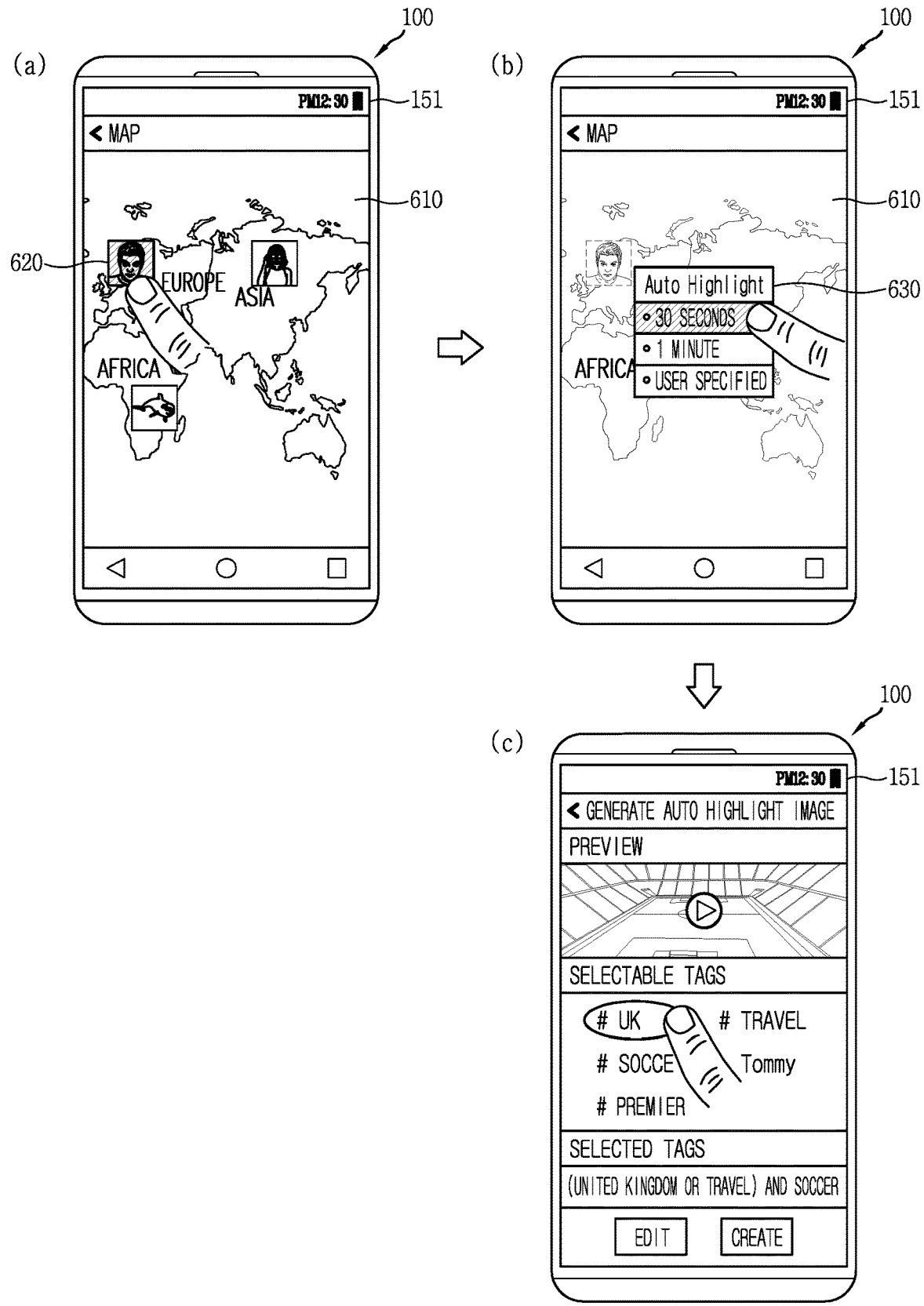
FIG. 6A is a conceptual view illustrating a method of generating a summary using a plurality of images related to a specific location.

Hereinafter, a method of generating a summary using a plurality of images will be described. FIG. 6A is a conceptual view illustrating a method of generating a summary using a plurality of images related to a specific location; FIG. 6A is a conceptual view illustrating a method of generating a summary using a plurality of images related to a specific location;

The controller 180 according to the present disclosure may generate a summary of image data based on a plurality of images satisfying a preset condition. Here, a plurality of images may include moving images, still images, audio data, and the like.

The preset condition may be a condition related to at least one of position and time. For example, the preset condition may be a condition of a video or an image captured at a specific position. For another example, the preset condition may be a condition of a video or an image captured on a specific date or during a specific period.

In other words, the present disclosure may generate a summary of not only one video but also a plurality of related videos or still images. Accordingly, the present disclosure may provide image data related to each other in a summarized form.

In order to generate a summary of a plurality of image data, the controller 180 may extract a plurality of images satisfying a preset condition. The controller 180 may detect a section in which at least one of objects included in the extracted images appears and then disappear, and generate a summary based on the detected section.

Hereinafter, with reference to FIG. 6A, a method of generating a summary of a plurality of images satisfying a position condition will be described.

As illustrated in FIG. 6A(a), the controller 180 may extract a plurality of images related to Europe in response to a touch input being applied to an European region 620 on a map screen 610. Then, as illustrated in FIG. 6A(b), the controller 180 may display a selection list 630 for selecting the playback time of a summary, and when a 30-second item among items included in the selection list 630 is selected, the controller 180 may set the playback time of the summary to 30 seconds.

Subsequent to setting the playback time, the controller 180 may extract objects from a plurality of images related to Europe based on a scene detection technology. Furthermore, as illustrated in FIG. 6A(c), the controller 180 may display tags corresponding to objects on the display unit 151 to allow the user to select at least one object among the extracted objects.

Then, the controller 180 may generate a summary based on a section in which at least one object appears and then disappears. The method of generating such a summary will be substituted by the earlier description. Through this, the user may receive compressed images related to a specific area.

Figure 6B:
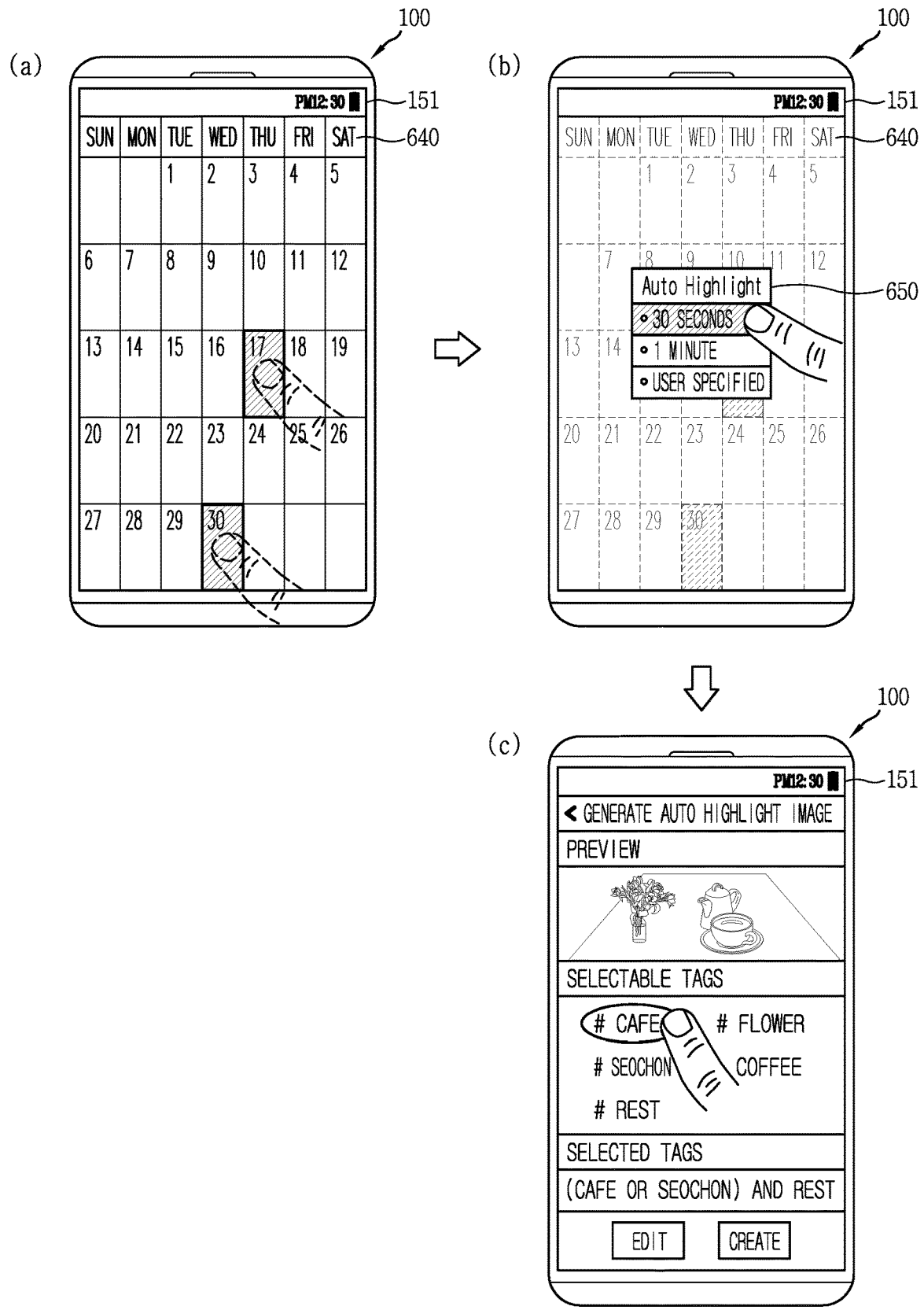
FIGS. 6B and 6C are conceptual views illustrating a method of generating a summary using a plurality of images related to a specific location.

Similarly, FIG. 6B illustrates a method of generating a summary based on a plurality of images related to a specific date. For example, as illustrated in FIG. 6B(a), the controller 180 may extract a plurality of images related to at least one date in response to a touch input to a calendar image 640. Here, the at least one date may be consecutive days with a specific period or a nonconsecutive day.

Then, as illustrated in FIGS. 6B(b) and 6B(c), images related to at least one date may be edited to generate a summary. A method of generating such a summary has been described above, and thus the detailed description thereof will be omitted.

Figure 6C:
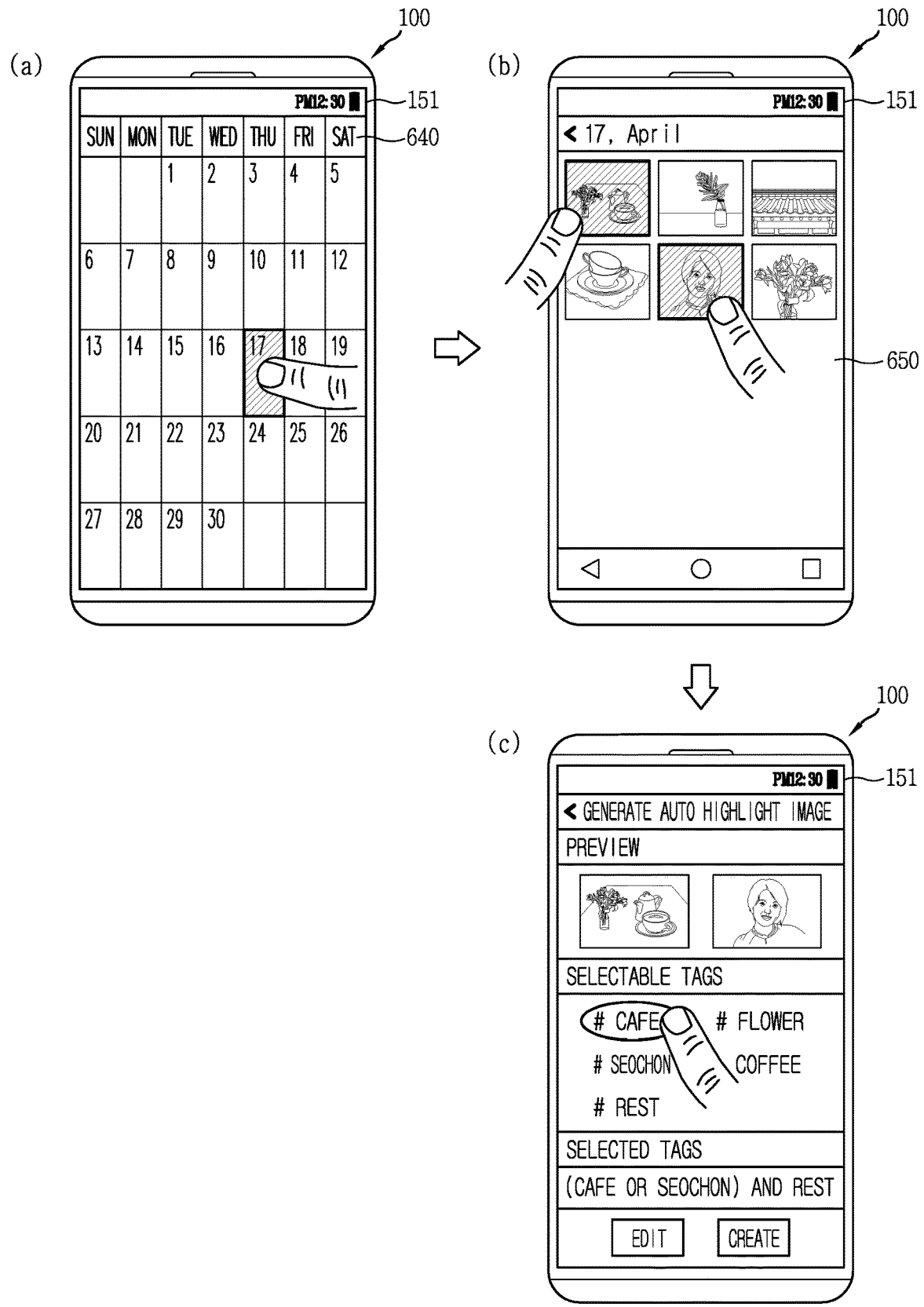

Furthermore, as illustrated in FIGS. 6C(a) and 6C(b), when at least one date is selected, the controller 180 may display a thumbnail image 660 of a plurality of images related to the at least one date on the display unit 151. Then, the controller 180 may select only a predetermined image among a plurality of images related to the at least one date to generate a summary.

In the above, a method of generating a summary using at least one image satisfying a condition related to at least one of position and time has been described. Through this, the present disclosure may receive images related to a specific place or a specific date in the form of a summary.

[How to Generate Summary Using Interactive Text]

Hereinafter, a method of generating a summary of video data based on interactive text will be described. FIGS. 7A through 7D are conceptual views illustrating a method of generating and sharing a summary of video data based on interactive text.

The controller 180 may generate a summary of video data based on interactive text. The interactive text may be a message transmitted/received to/from an external terminal, voice information entered to the terminal, image information entered to the terminal, audio information entered to the terminal, and the like.

More specifically, the controller 180 may analyze the interactive text based on a preset algorithm. An algorithm for analyzing a previously known text may be used as the preset algorithm, and the detailed description thereof will be omitted in order not to obscure the gist of the present disclosure.

The controller 180 may extract video data based on the analysis result. More specifically, the controller 180 may extract at least one tag from the analysis result, and extract video data based on the extracted tag. The at least one tag may be location information, time information, and the like.

Hereinafter, as an embodiment using interactive text, a method of generating a summary of video data based on a message transmitted to and received from a counterpart terminal will be described with reference to FIG. 7A.

Figure 7A:
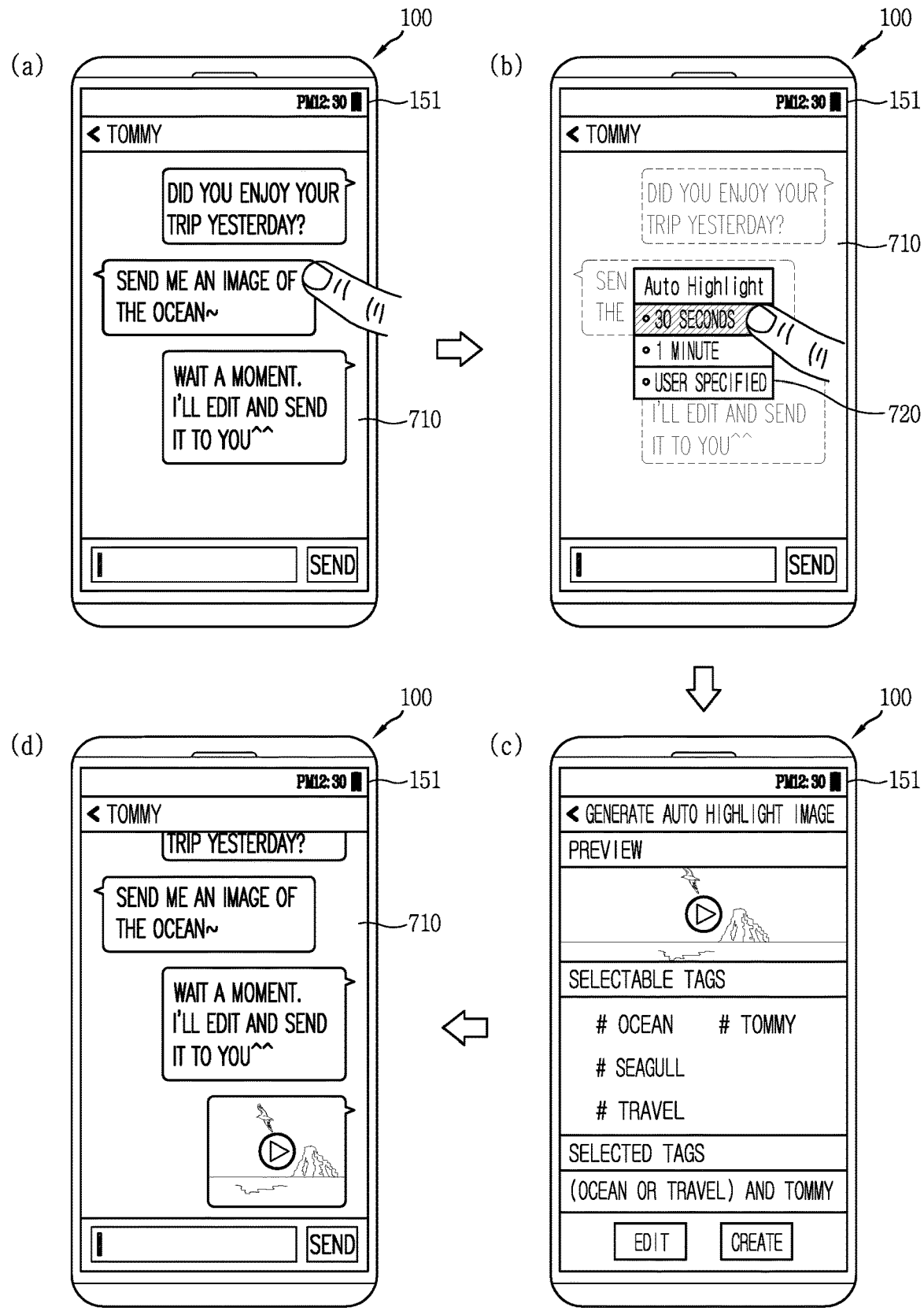
FIGS. 7A through 7D are conceptual views illustrating a method of generating and sharing a summary of video data based on interactive text.

As illustrated in FIG. 7A(a), the controller 180 may analyze the content of a message 'Send me an image of the ocean' received from the counterpart terminal based on a user control command, and extract location information 'ocean' as a tag based on the analysis result. The user control command may be a long touch input to a region in which the message 'Send me an image of the ocean' is displayed.

Then, the controller 180 may extract video data related to the extracted tag 'ocean'. Here, a video related to ocean may include an object corresponding to the ocean or may be a video including location information on a place where the ocean exists. Then, as illustrated in FIGS. 7A(b) and 7A(c), the controller 180 may generate a summary of video data as described above.

Meanwhile, as illustrated in FIG. 7A(d), when a summary of video data is generated based on the content of a message, the controller 180 may immediately transmit the generated summary to the counterpart terminal that has transmitted the message. Therefore, the present disclosure may improve the convenience of data sharing when sharing video data with the other party.

Figure 7B:
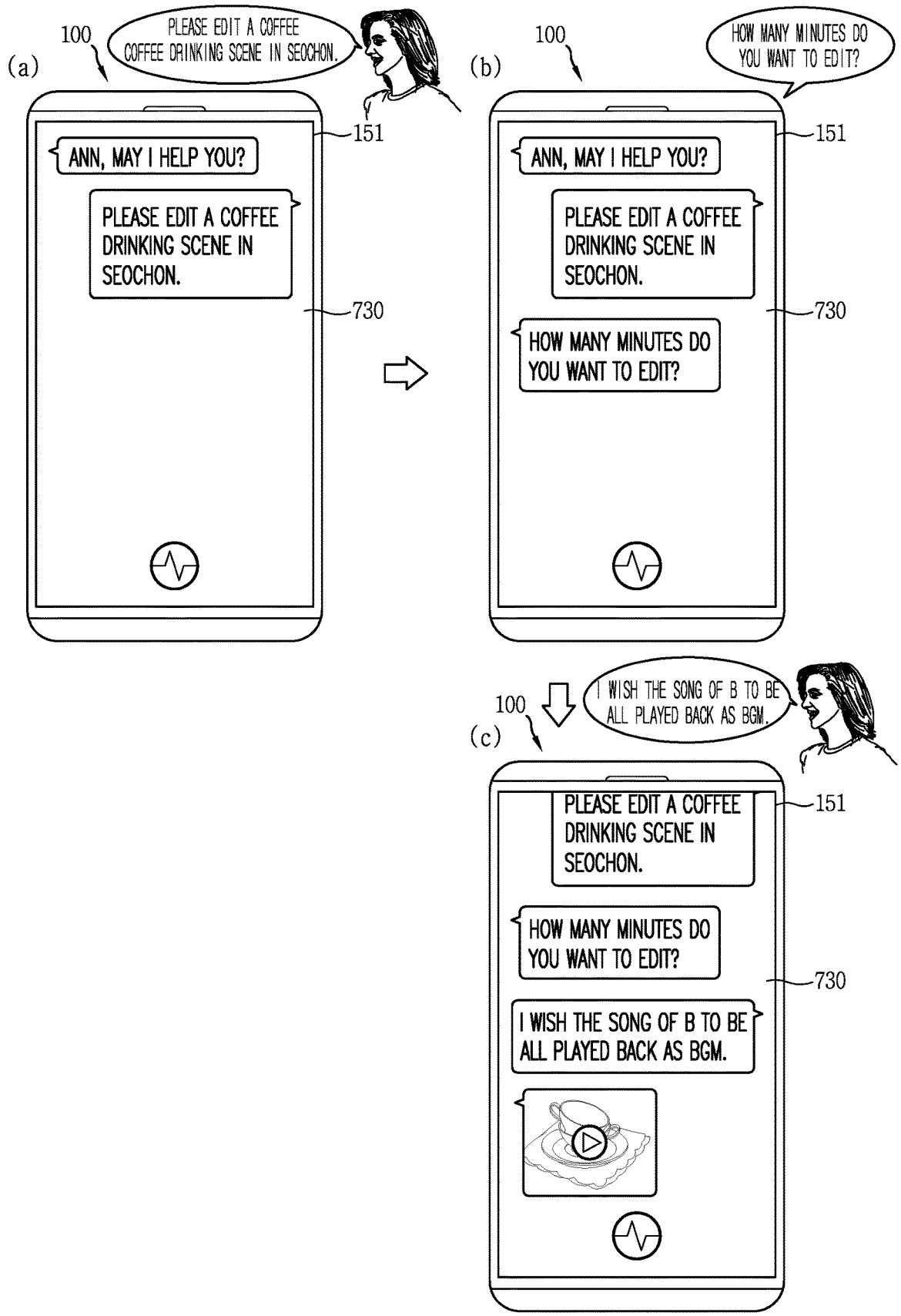

In addition, as illustrated in FIG. 7B, the controller 180 may generate a summary of video data based on voice information input or output between the user and the terminal.

As illustrated in FIG. 7B(a), the controller 180 may analyze voice information 'Edit a coffee drinking scene in Seochon' received from the user. The controller 180 may analyze voice information using a voice analysis algorithm provided by a voice recognition application. In addition, when voice information is received, the controller 180 may convert the received voice information into text to display it on the display unit 151 as an interactive text 730. Various algorithms previously known in the art may be used for the voice analysis algorithm.

The controller 180 may extract 'Seochon,' which location information, and 'coffee,' which is object information, from the analyzed voice information. Then, the controller 180 may extract specific video data based on the extracted tag.

Meanwhile, when the playback time is not set during the generation of a video summary, the controller 180 may generate a summary to have a default playback time (e.g., 30 seconds) or set a playback time of the summary based on the user's voice command.

For example, as illustrated in FIG. 7B(b), the controller 180 may output voice information 'How many minutes do you want to edit?' through the speaker and the display unit to induce an utterance of the voice command related to playback time setting. Then, as illustrated in FIG. 7B(c), when a voice command 'I wish the song of B to be all played back as BGM' is received, the received voice command can be analyzed. Then, the controller 180 may set a playback time of the song of B to the playback time of the summary based on the analysis result.

The controller 180 may generate a summary having the set playback time as described above.

Furthermore, the controller 180 may generate a summary of video data based on an artificial intelligence algorithm. The artificial intelligence algorithm may be a statistical algorithm capable of performing machine learning.

First, the controller 180 may execute an artificial intelligence application. The artificial intelligence application is an application program that provides a function capable of analyzing information received from a user through an artificial intelligence algorithm. When the artificial intelligence application is executed, the controller 180 may display information input from the user and information output from the terminal on the display unit 151 as an interactive text 740 or 750.

Figure 7C:
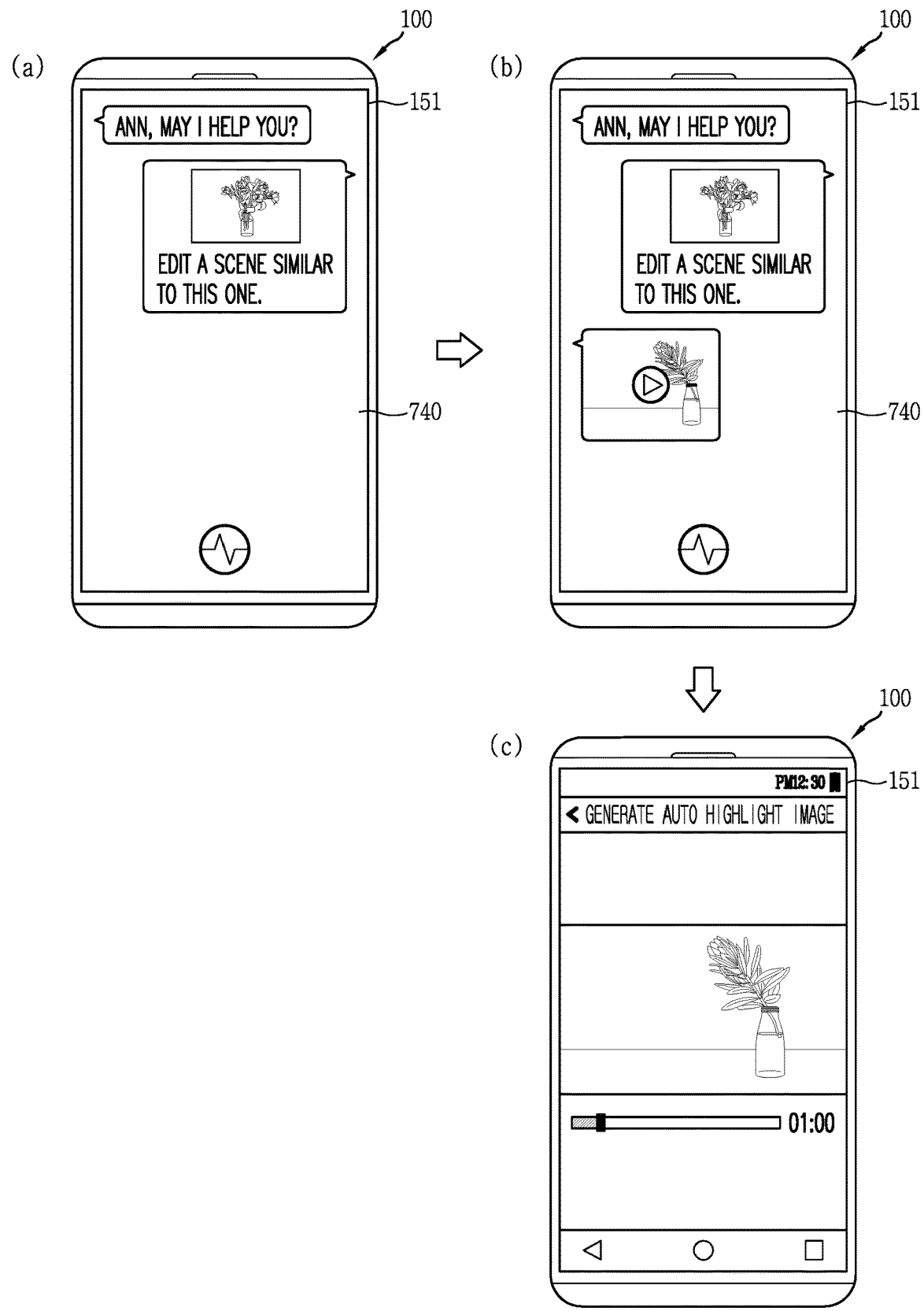

Referring to FIG. 7C(a), the controller 180 may receive a control command for generating a summary of image data including images similar to a specific image during execution of the artificial intelligence application. In this case, the controller 180 may extract images similar to the specific image based on the artificial intelligence algorithm. The similar images may be images including the same object, images including the same location information, and the like.

Then, as illustrated in FIGS. 7C(b) and 7C(c), the controller 180 may generate a summary of the extracted images as described above.

Figure 7D:
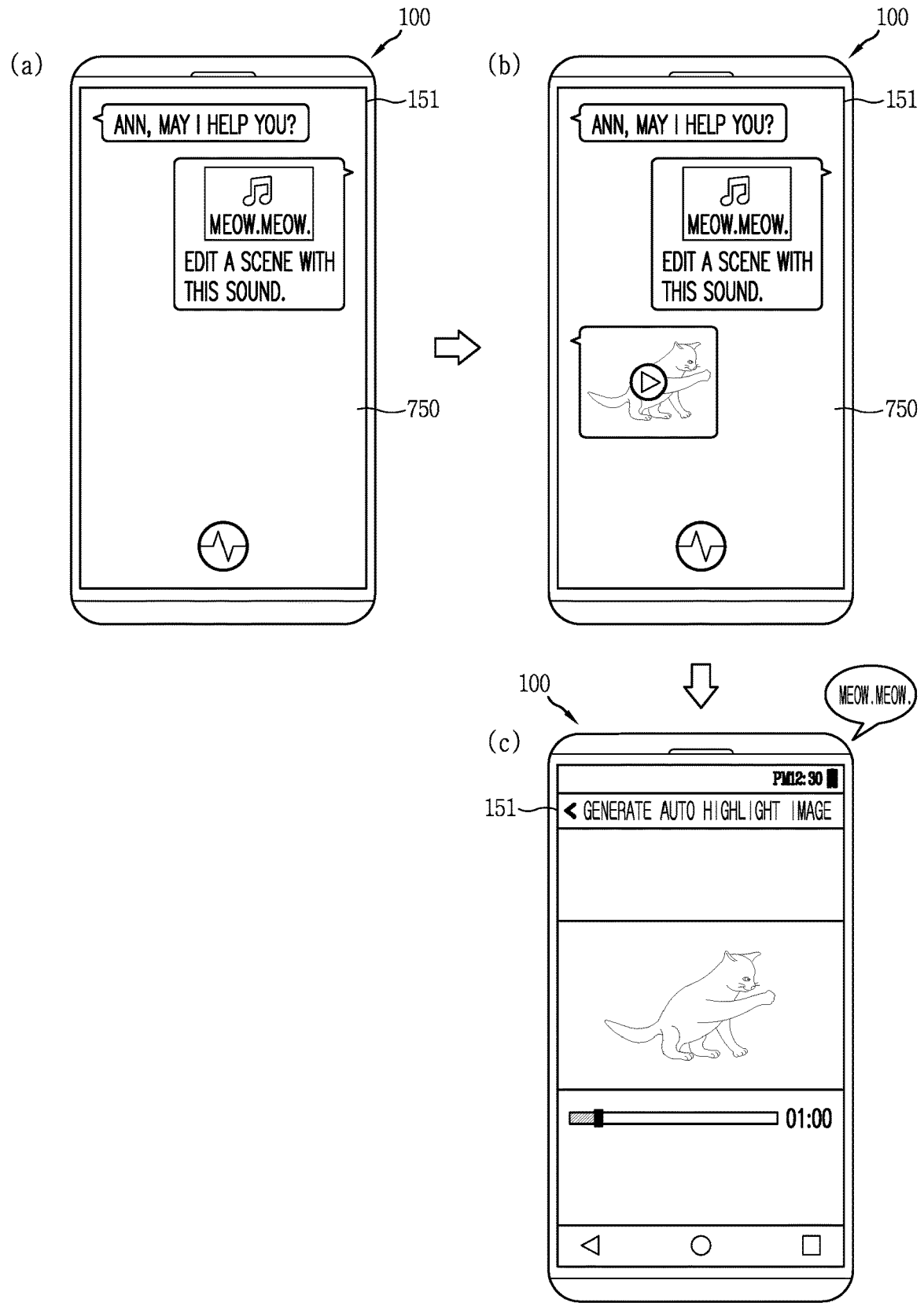

Furthermore, referring to FIG. 7D(a), the controller 180 may receive a control command for generating a summary of image data including audio data similar to specific audio data during execution of the artificial intelligence application. In this case, the controller 180 may extract image data including audio data similar to specific audio data based on the artificial intelligence algorithm. The image data may include a video including audio data identical to specific audio data. Then, as illustrated in FIGS. 7D(b) and 7D(c), the controller 180 may generate a summary of the extracted image data.

As described above, the present disclosure may generate a summary of image data based on interactive text. Through this, the present disclosure may improve the convenience of generating a summary of image data.

[Summary Sharing Scene]

Figure 8:
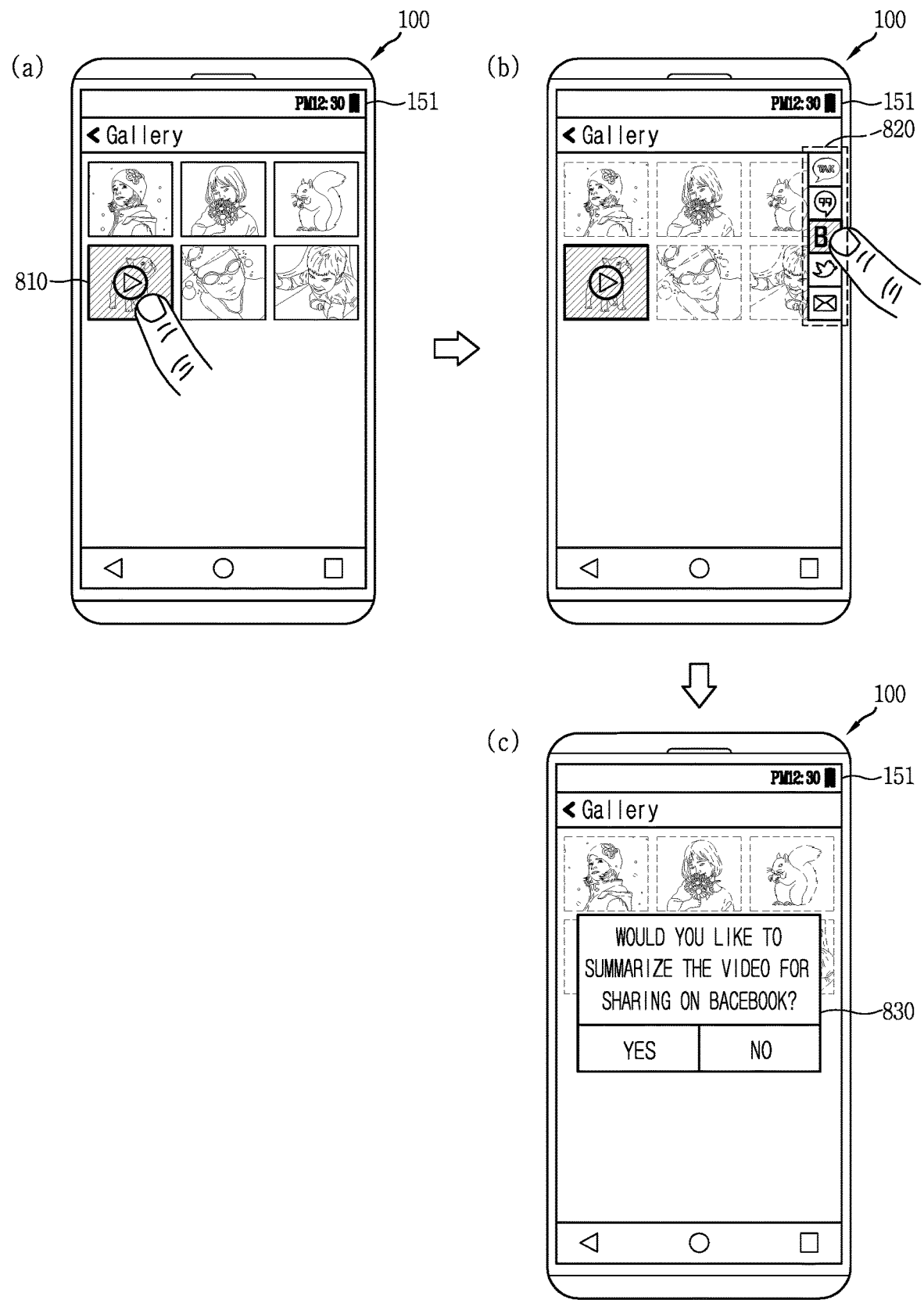
FIG. 8 is a conceptual view illustrating a method of sharing a summary of video data through an SNS application.

Hereinafter, a method of sharing a summary of video data through an SNS application will be described. FIG. 8 is a conceptual view illustrating a method of sharing a summary of video data through an SNS application.

A social network service (SNS) application may share data through an SNS server. The sharing of the data denotes transmitting data to an SNS server so that any user that has accessed the SNS server is able to access data uploaded to the SNS server.

On the other hand, it may be possible to set a restriction on the capacity of video data when sharing the video data according to various restriction conditions such as the capacity restriction of the video data or the restriction of data communication amount set for the SNS application itself.

Accordingly, the controller 180 may use the summary of video data when sharing the video data through the SNS application. More specifically, as illustrated in FIGS. 8A and 8B, in response to a long touch applied to a thumbnail image 810 indicating video data, the controller 180 may display an app list 820 with SNS applications capable of sharing the video data. The app list 820 may include SNS application items stored in the terminal.

As illustrated in FIG. 8C, when a specific application (ex. Bacebook) is selected, the controller 180 may display a popup window 830 for asking whether or not to generate a summary of video data.

When a control command for generating a summary of video data is input through the popup window 830, the controller 180 may generate a summary of the video data. In this case, the controller 180 may generate a summary of video data in consideration of the capacity restriction of the video data and the restriction of data communication amount set for each SNS application. For example, when the playback time is limited to 30 seconds in the SNS application, the controller 180 may set the playback time of a summary of video data to 30 seconds to generate the summary of the video data.

In the above, a method of generating a summary of video data for sharing an SNS application has been described. Therefore, the present disclosure may improve the convenience of sharing video data.

[Filter Function Added Scene]

Figure 9:
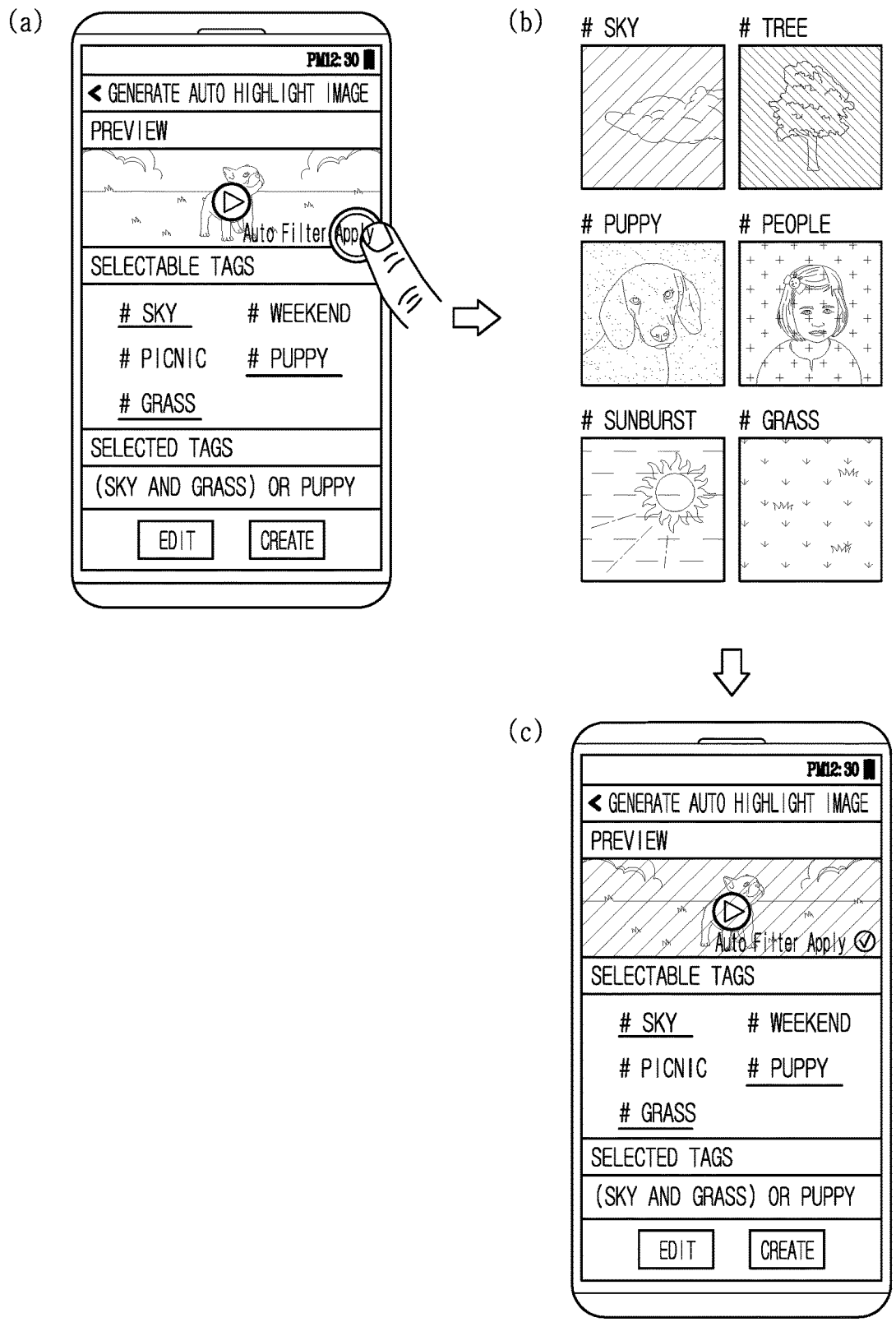
FIG. 9 is a conceptual view illustrating a method of setting a filter function on a summary of video data based on a tag corresponding to an object included in the video data.

Hereinafter, a method of setting a filter function to a summary of video data will be described. FIG. 9 is a conceptual view illustrating a method of setting a filter function on a summary of video data based on a tag corresponding to an object included in the video data.

The controller 180 may set a filter function on a summary of video data based on a tag corresponding to an object included in the video data.

A tag corresponding to the object may have a specific filter function set in advance. For example, as illustrated in FIG. 9B, a 'blue filter' may be set to 'sky', and a 'landscape filter' may be set to 'tree', and the like.

The controller 180 may set a filter effect set for a tag corresponding to each object for each section in which objects included in video data appear and then disappear. For example, the controller 180 may set a 'blue filter' for a section in which 'sky' appears and then disappears, and a 'landscape filter' for a section in which 'tree' appears and then disappears.

Furthermore, the controller 180 may edit a section in which the filter function is set to generate a summary of video data. More specifically, referring to FIG. 9A, the controller 180 may sense that a control command for automatically setting a filter function is applied to the summary. In this case, as illustrated in FIGS. 9B and 9C, the controller 180 may set a different filter function for each section in which each object appears and then disappears based on tags corresponding to objects.

Through this, the present disclosure may generate a summary for which various effects are conveniently set.

[Video Summary Editing Scene]

Hereinafter, a method of editing a summary will be described. FIGS. 10A through 10D are conceptual views illustrating an embodiment of editing a summary.

Subsequent to generating a summary, the controller 180 may edit the generated summary based on the user's control command. For example, as illustrated in FIG. 10A(a), the controller 180 may execute an edit function of a summary based on a touch input applied to an icon 380*a* indicating a summary edit function.

When the edit function of the summary is carried out, the controller 180 may display a thumbnail image corresponding to a plurality of sections included in the summary on the display unit 151. The thumbnail image may be a specific still image included in each section or a video indicating part of each section.

Figure 10A:
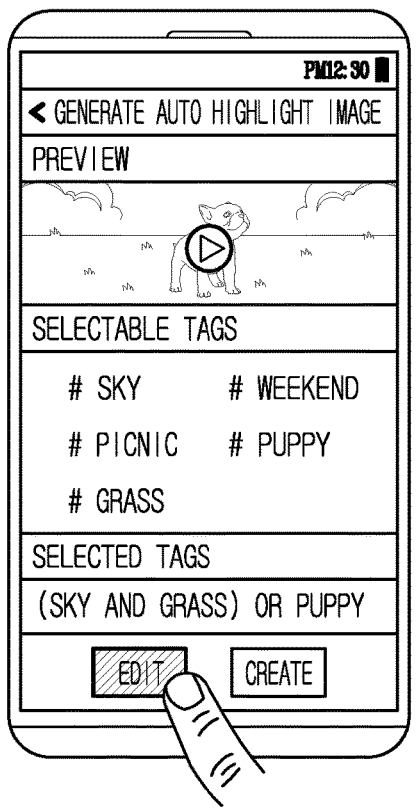
FIGS. 10A through 10D are conceptual views illustrating an embodiment of editing a summary.
Figure 10A:
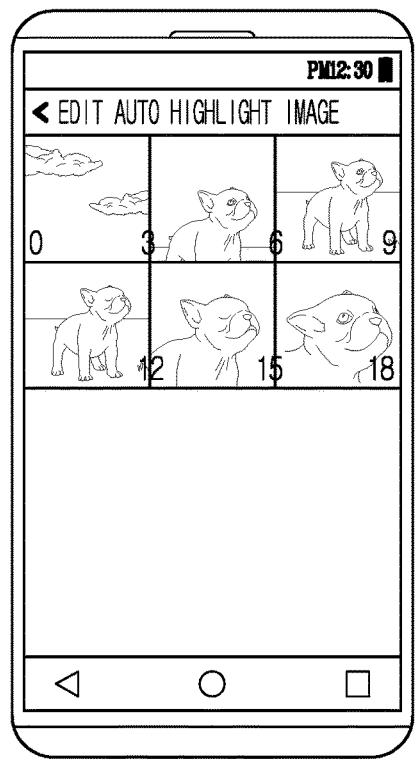
Figure 10A:
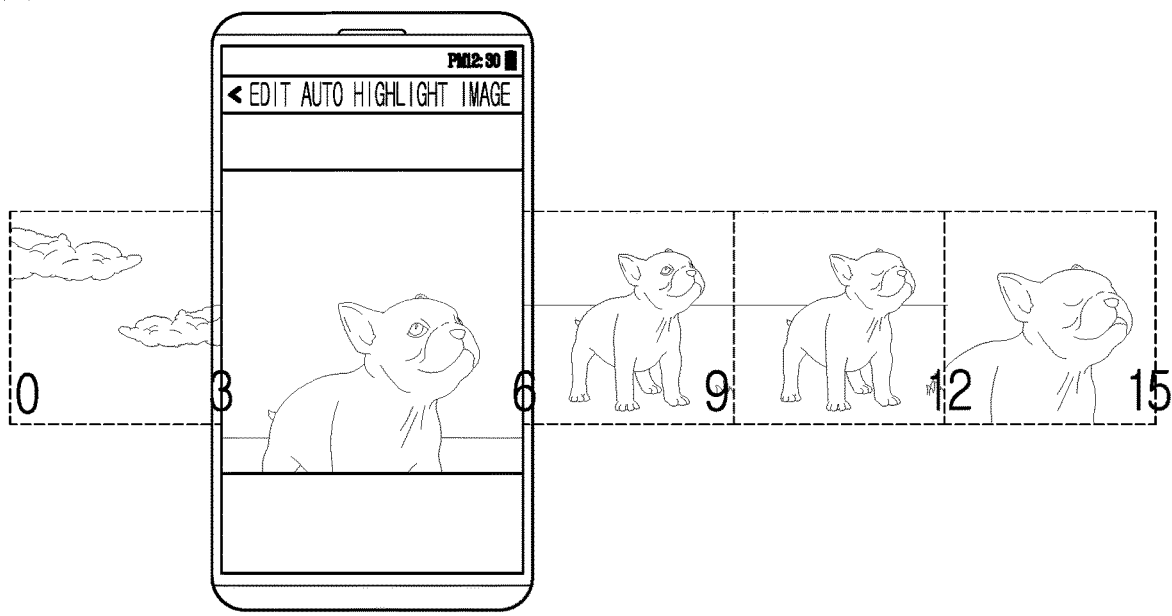

For example, as illustrated in FIG. 10A(b), the controller 180 may display a video corresponding to a plurality of frames together on the display unit 151. Alternatively, as illustrated in FIG. 10A(c), the controller 180 may display a video corresponding to any one of a plurality of frames on the display unit 151. In this case, the controller 180 may display a video with a different frame on the display unit 151 in response to a swipe input, a drag input or a flicking input.

The controller 180 may edit at least one of a playback time and a playback speed of a section corresponding to each frame based on a different touch input to the plurality of thumbnail images.

Figure 10B:
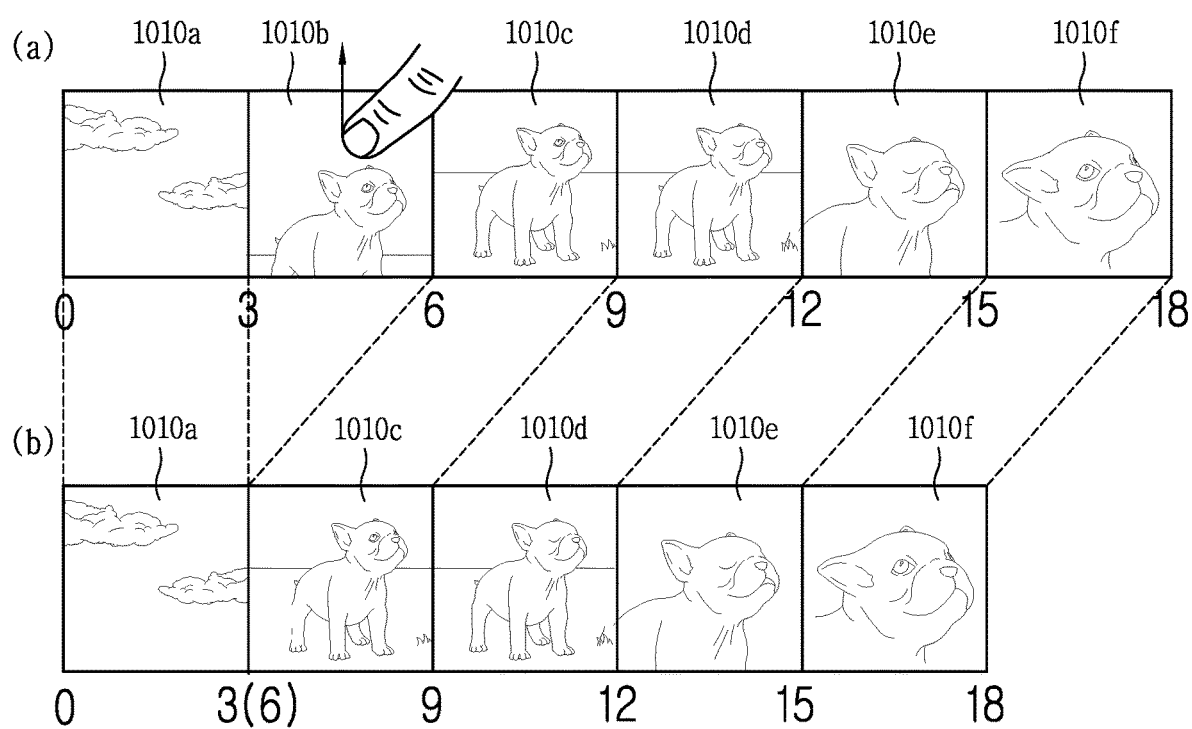

For example, as illustrated in FIGS. 10B(a) and 10B(b), the controller 180 may delete a section corresponding to a second thumbnail from the summary in response to a swipe input moving from the bottom to the top to a second thumbnail image 1010*b* among first through sixth thumbnail images 1010*a* through 1010*f*. In this case, an entire playback time of the summary may be reduced by a playback time of the section corresponding to the second thumbnail image.

Figure 10C:
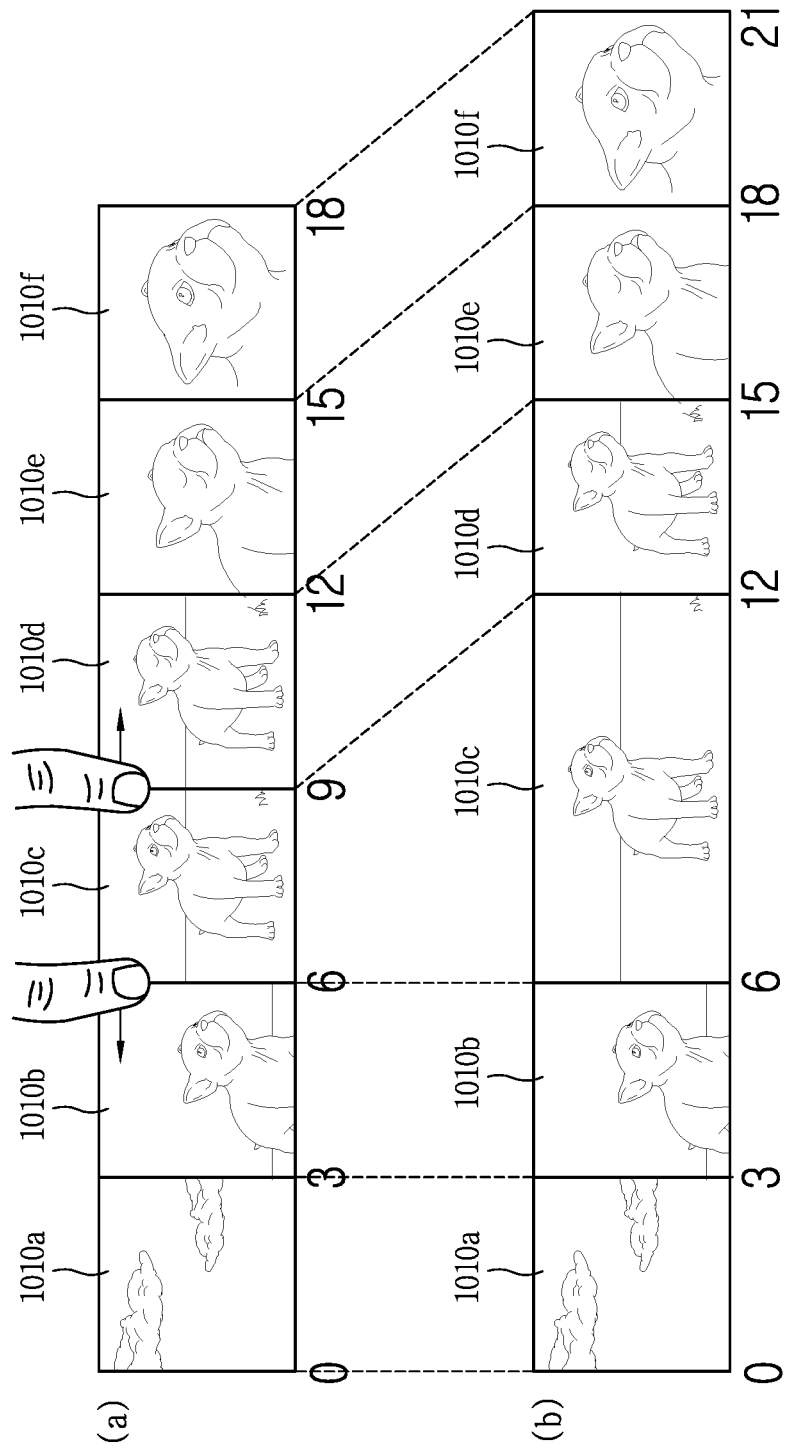

For another example, as illustrated in FIGS. 10C(a) and 10C(b), the controller 180 may increase a playback time of a section corresponding to a third thumbnail image 1010*c* in response to a pinch-out input applied to a left/right boundary region of the third thumbnail image 1010*c*. In this case, the controller 180 may increase an entire playback time of the summary by a playback time of the section corresponding to the third thumbnail image 1010*c*.

Alternatively, though not shown in the drawing, the controller 180 may reduce a playback time of a section corresponding to the second thumbnail image 1010*b* and the fourth thumbnail image 1010*d*, which is front and rear sections of the section corresponding to the third thumbnail image 1010*c* as a playback time of the section corresponding to the third thumbnail image 1010*c* increases. In this case, an entire playback time of the summary may not change.

Figure 10D:
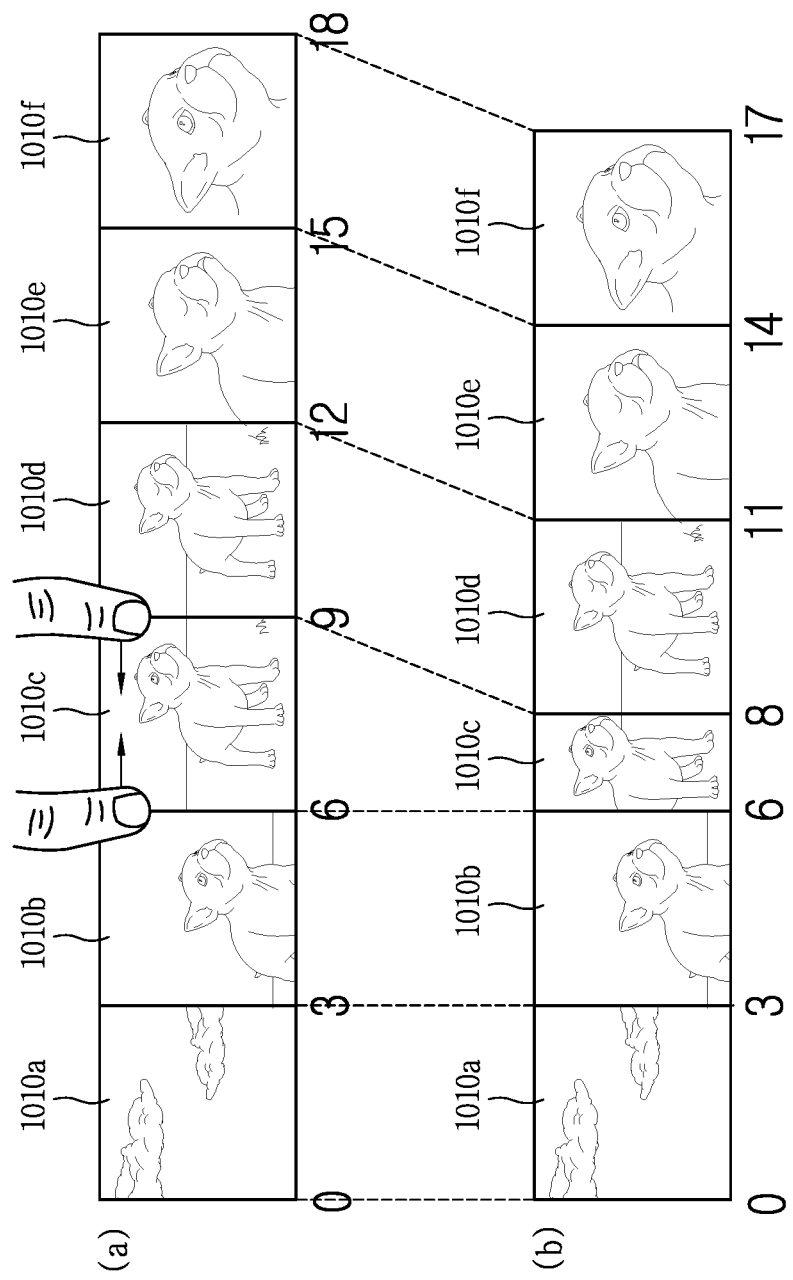

For another example, as illustrated in FIGS. 10D(a) and 10D(b), the controller 180 may reduce a playback time of a section corresponding to a third thumbnail image 1010*c* in response to a pinch-in input applied to a left/right boundary region of the third thumbnail image 1010*c*. In this case, the controller 180 may reduce an entire playback time of the summary by a playback time of the section corresponding to the third thumbnail image 1010*c*.

Alternatively, though not shown in the drawing, the controller 180 may increase a playback time of a section corresponding to the second thumbnail image 1010*b* and the fourth thumbnail image 1010*d*, which is front and rear sections of the section corresponding to the third thumbnail image 1010*c* as a playback time of the section corresponding to the third thumbnail image 1010*c* decreases. In this case, an entire playback time of the summary may not change.

In the above, a method of editing the generated summary has been described. Through this, the present disclosure makes it easier to edit the generated summary.

The present disclosure may detect a section in which objects included in a video appear and then disappear through a scene detection technology, and generate a summary of video data based on a section in which at least one of the objects of the video appears and then disappears according to a user's selection or priority, thereby generating a summary including key content or interesting scenes of the video. Therefore, the present disclosure may generate a summary that may cause a user's interest.

Furthermore, the present disclosure may detect an object for each frame constituting a video using a scene detection technology, thereby detecting the emergence and exit of an object, a scene transition, a place change or the like without detecting the object in real time.

In addition, the present disclosure may generate a summary of a plurality of image data satisfying a preset condition, thereby quickly and easily providing information on the plurality of image data satisfying the preset condition.

The foregoing present disclosure may be implemented as codes readable by a computer on a medium written by the program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 180 of the portable electronic device. The foregoing embodiments are merely exemplary and are not to be considered as limiting the present disclosure. The scope of the invention should be determined by reasonable interpretation of the appended claims and all changes that come within the equivalent scope of the invention are included in the scope of the invention.

What is claimed is:

1. A portable electronic device, comprising:
   a memory configured to store video data;
   a touch screen configured to receive a touch input related to a summary of the video data; and
   a controller configured to generate the summary of the video data in response to the touch input,
   wherein the controller extracts objects included in the video data, and detects a section in which at least one of the extracted objects appears and then disappears, and edits the video data based on the detected section to generate a summary of the video data, wherein the controller calculates result data related to the extracted objects for each of a plurality of frames based on detection of whether one or more of the extracted objects are present in an image of each frame, wherein the controller detects at least two frames in which the result data from a preceding frame has changed, wherein the controller detects the section in which at least one of the extracted objects appears and then disappears using the at least two frames, wherein the controller generates a plurality of summaries having different playback times based on the detected section, and displays preview images of the plurality of summaries on different regions of the touch screen, respectively, and wherein when any one summary of the plurality of summaries is played back, the controller plays remaining summaries except the played back summary at a time point corresponding to a current playback position of the played back summary.

2. The portable electronic device of claim 1, wherein the controller displays tags corresponding to the extracted objects, respectively, on the touch screen, and detects a section in which objects corresponding to at least one tag among the tags appear and then disappear based on a touch input to the at least one tag.

3. The portable electronic device of claim 1, wherein the controller detects a section in which objects corresponding to two or more tags among the tags appear and then disappear according to a different operation condition according to a touch type of touch input applied to the two or more tags.

4. The portable electronic device of claim 3, wherein the controller detects a section in which two or more objects corresponding to the two or more tags, respectively, appear and then disappear at the same time when a first type of touch input is applied to the two or more tags, and detects a section in which at least one of two or more objects corresponding to the two or more tags, respectively, appears and then disappears when a second type of touch input is applied to the two or more tags.

5. The portable electronic device of claim 1, wherein the controller detects additional images added to the remaining summaries based on a summary having the shortest playback time among the plurality of summaries, and further displays an image corresponding to an additional image on preview images of the remaining summaries.

6. The portable electronic device of claim 1, wherein a plurality of image data are stored in the memory, and the controller extracts at least one image data satisfying a preset condition among the plurality of image data, and generates a summary of image data based on a section in which at least one of objects included in the extracted at least one image data appears and then disappears.

7. The portable electronic device of claim 6, wherein the preset condition is a condition related to at least one of location, time, image, and audio information.

8. The portable electronic device of claim 1, wherein the controller divides the video data into a plurality of frames, and extracts a start frame in which an object appears and an end frame in which the object disappears for each of the objects included in the video data.

9. The portable electronic device of claim 8, wherein the controller detects a section between the start frame in which the object appears and the end frame in which the object disappears as a section in which the object appears and then disappears.

10. The portable electronic device of claim 1, wherein the controller assigns a priority between objects included in the video data, and determines at least one object to be included in the summary among the objects based on the priority.

11. The portable electronic device of claim 10, wherein the priority is determined by at least one of a use frequency of tags corresponding to an object and a category of the object.

12. The portable electronic device of claim 1, wherein the controller displays a thumbnail image corresponding to the detected section on the touch screen, and edits the detected section based on a touch input to the thumbnail image.

13. The portable electronic device of claim 12, wherein the controller increases or decreases at least one of a playback time or a playback speed of the detected section.

14. A method of controlling a portable electronic device, the method comprising:

receiving a touch input related to a summary of video data;

extracting objects included in the video data in response to the touch input;

detecting a section in which at least one of the extracted objects appears and then disappears;

generating a plurality of summaries having different playback times based on the detected section, and displaying preview images of the plurality of summaries on different regions of a touch screen, respectively, and when any one summary of the plurality of summaries is played back, playing remaining summaries except the played back summary at a time point corresponding to a current playback position of the played back summary, wherein detecting the section in which at least one of the extracted objects appears and then disappears comprises:

calculating result data related to the extracted objects for each of a plurality of frames based on detection of whether one or more of the extracted objects are present in an image of each frame, detecting at least two frames in which the result data from a preceding frame has changed, and detecting the section in which at least one of the extracted objects appears and then disappears using the at least two frames.

15. The method of claim 14, wherein said detecting a section in which the at least one of the extracted objects appears and then disappears divides the video data into a plurality of frames having a preset time period, and extracts a start frame in which at least one object of the plurality of frames appears and an end frame in which the at least one object disappears, and detects a section between the extracted start frame and the extracted end frame.

16. The method of claim 14, wherein a priority is assigned between the extracted objects, and the at least one object is determined based on the priority.

17. The method of claim 14, wherein a playback time or capacity of the summary of the video data is increased or decreased a playback time or capacity based on a user control command.

* * * * *